United States Patent [19]

Daniels et al.

[11] 4,266,270
[45] May 5, 1981

[54] MICROPROCESSOR HAVING PLURAL INTERNAL DATA BUSES

[75] Inventors: R. Gary Daniels, Round Rock; Fuad H. Musa; William B. Wilder, Jr., both of Austin; Michael F. Wiles, Round Rock, all of Tex.; Thomas H. Bennett, Scottsdale, Ariz.

[73] Assignee: Motorola, Inc., Schaumburg, Ill.

[21] Appl. No.: 939,741

[22] Filed: Sep. 5, 1978

[51] Int. Cl.[3] .............................................. G06F 1/00
[52] U.S. Cl. ................................................... 364/200
[58] Field of Search ................ 364/200, 900 MS File

[56] References Cited

U.S. PATENT DOCUMENTS

| | | | |
|---|---|---|---|
| 3,810,114 | 5/1974 | Yamada et al. | 364/200 |
| 3,813,651 | 5/1974 | Yamada | 364/200 |
| 4,003,028 | 1/1977 | Bennett et al. | 364/200 |
| 4,041,472 | 8/1977 | Shah et al. | 364/200 |
| 4,069,510 | 1/1978 | Carlow | 364/200 |
| 4,125,901 | 11/1978 | Merrow et al. | 364/736 |

*Primary Examiner*—Mark E. Nusbaum
*Assistant Examiner*—David Y. Eng

*Attorney, Agent, or Firm*—Anthony J. Sarli, Jr.; Walter W. Nielsen; Jeffrey Van Myers

[57] ABSTRACT

A microprocessor comprises an internal address bus having a first portion (2,4) having a plurality of conductors carrying the low order address byte and a second portion (10) having a plurality of conductors for carrying the high order address byte. The microprocessor further comprises a plurality of registers, including an incrementor (12,13), a program counter (14,15), a temporary register (16,17), a stack pointer (18,19), an index register (20,21), and an accumulator (22,24), each comprising a pair of 8-bit registers for temporarily storing information. An arithmetic logic unit (28) performs computational operations on digital information within the microprocessor. The microprocessor includes a pair of internal data buses (6,8) each having a plurality of conductors for conducting digital information within the microprocessor. Means are provided for coupling selected ones of the registers, or the high or low order portions thereof, to the first and second data buses. The provision plural internal data buses permits a greater number of transfers of digital information to occur within the microprocessor during each machine cycle. The result is more efficient microprocessor operation and higher throughput.

3 Claims, 52 Drawing Figures

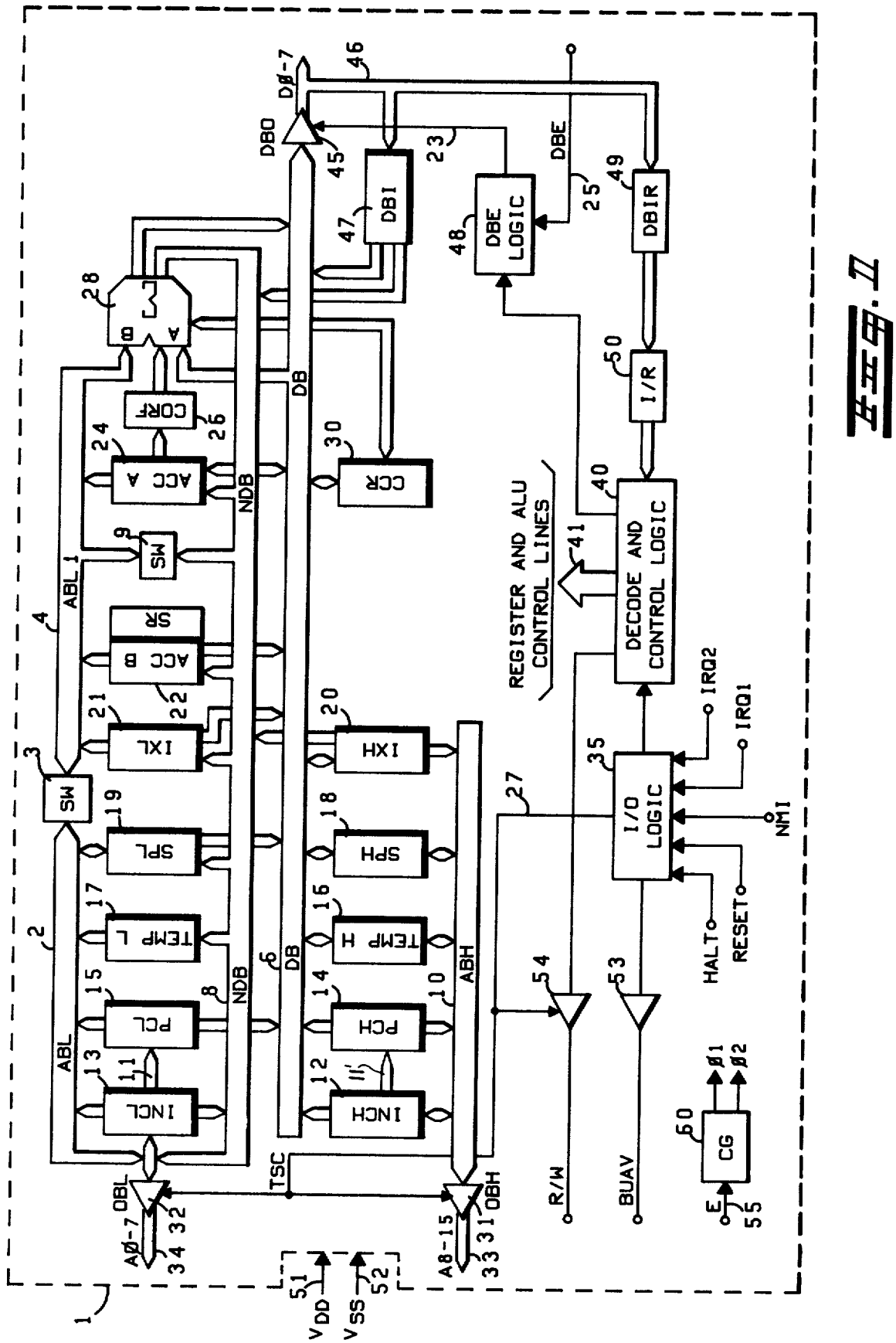

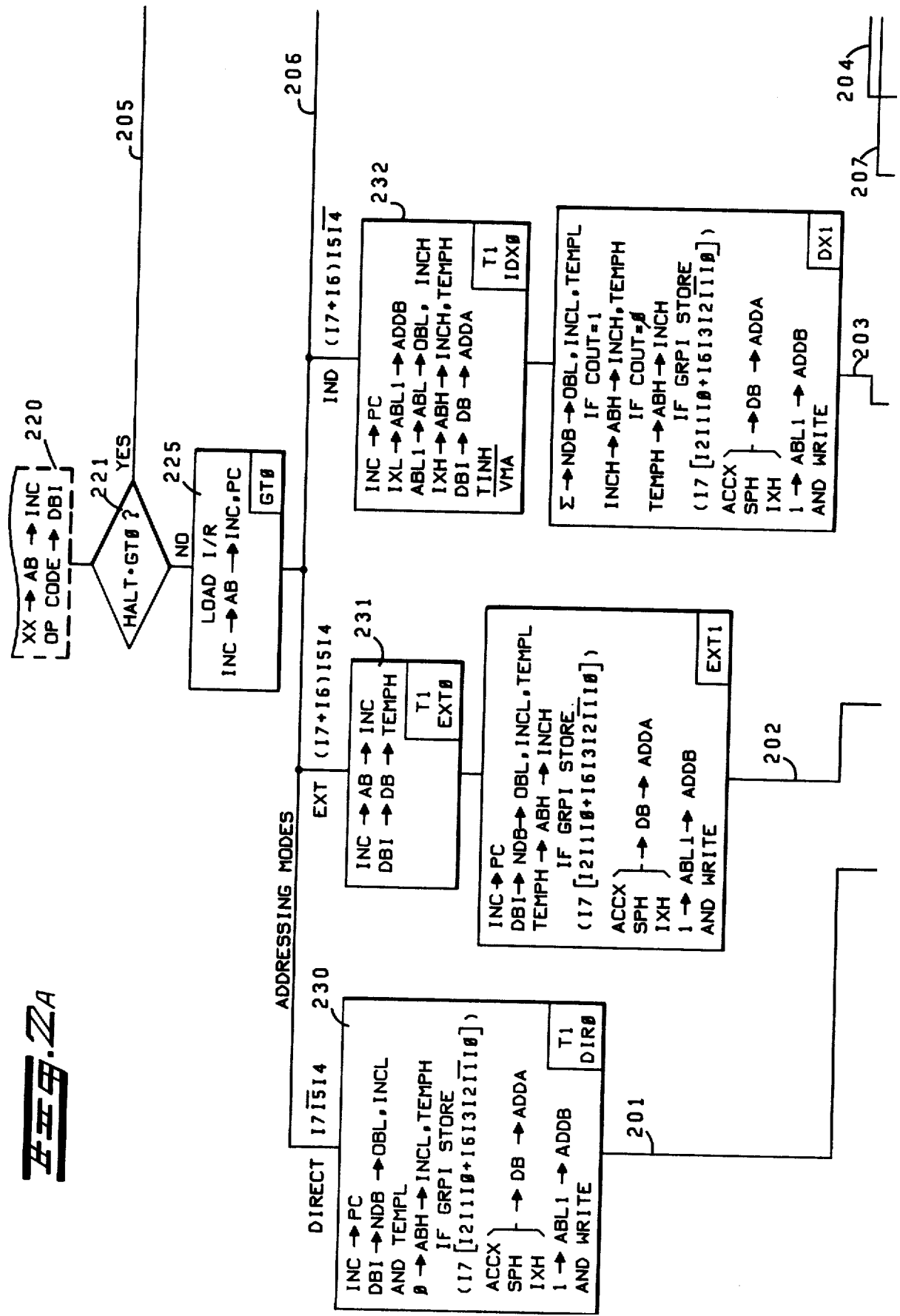

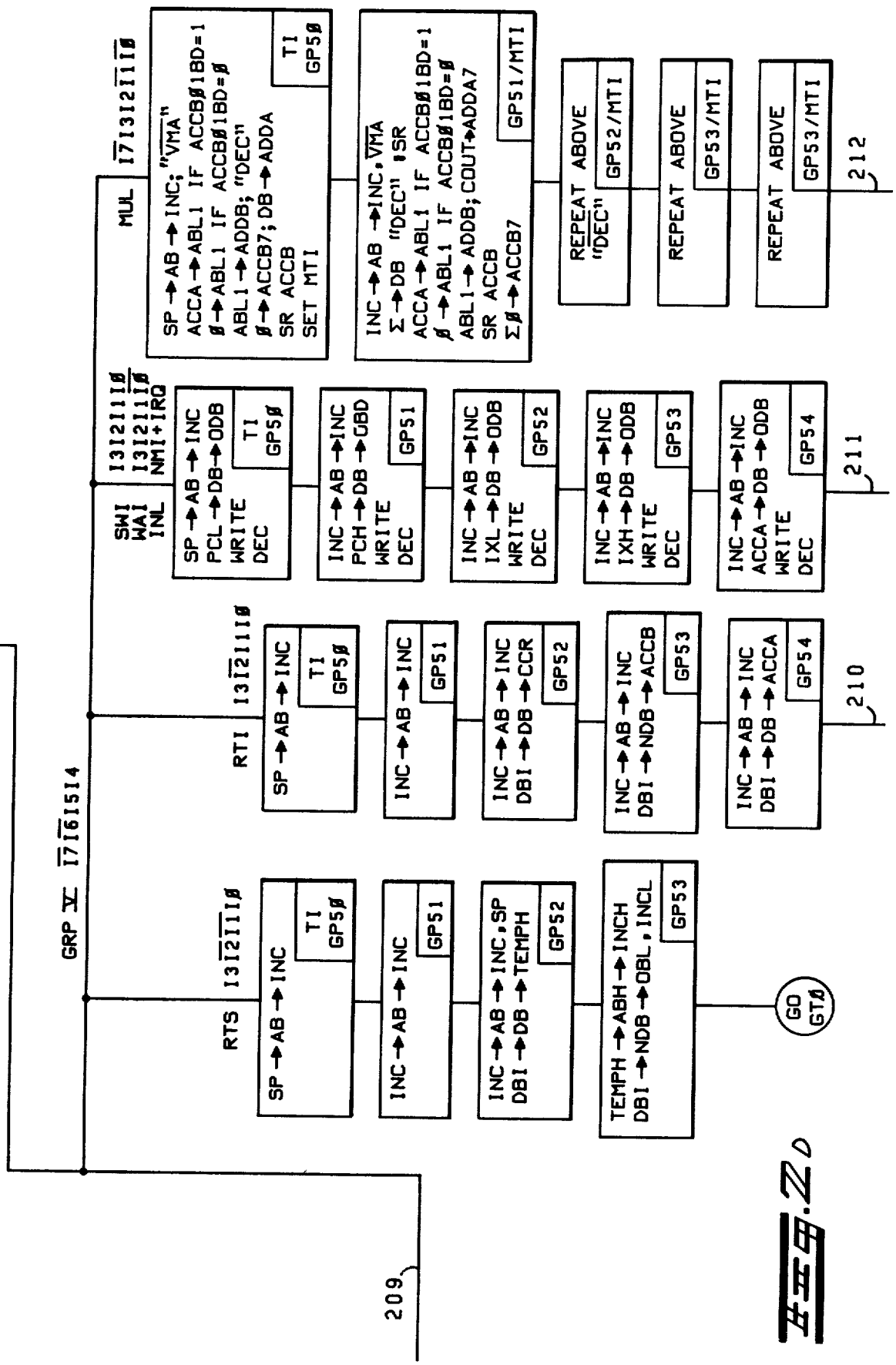

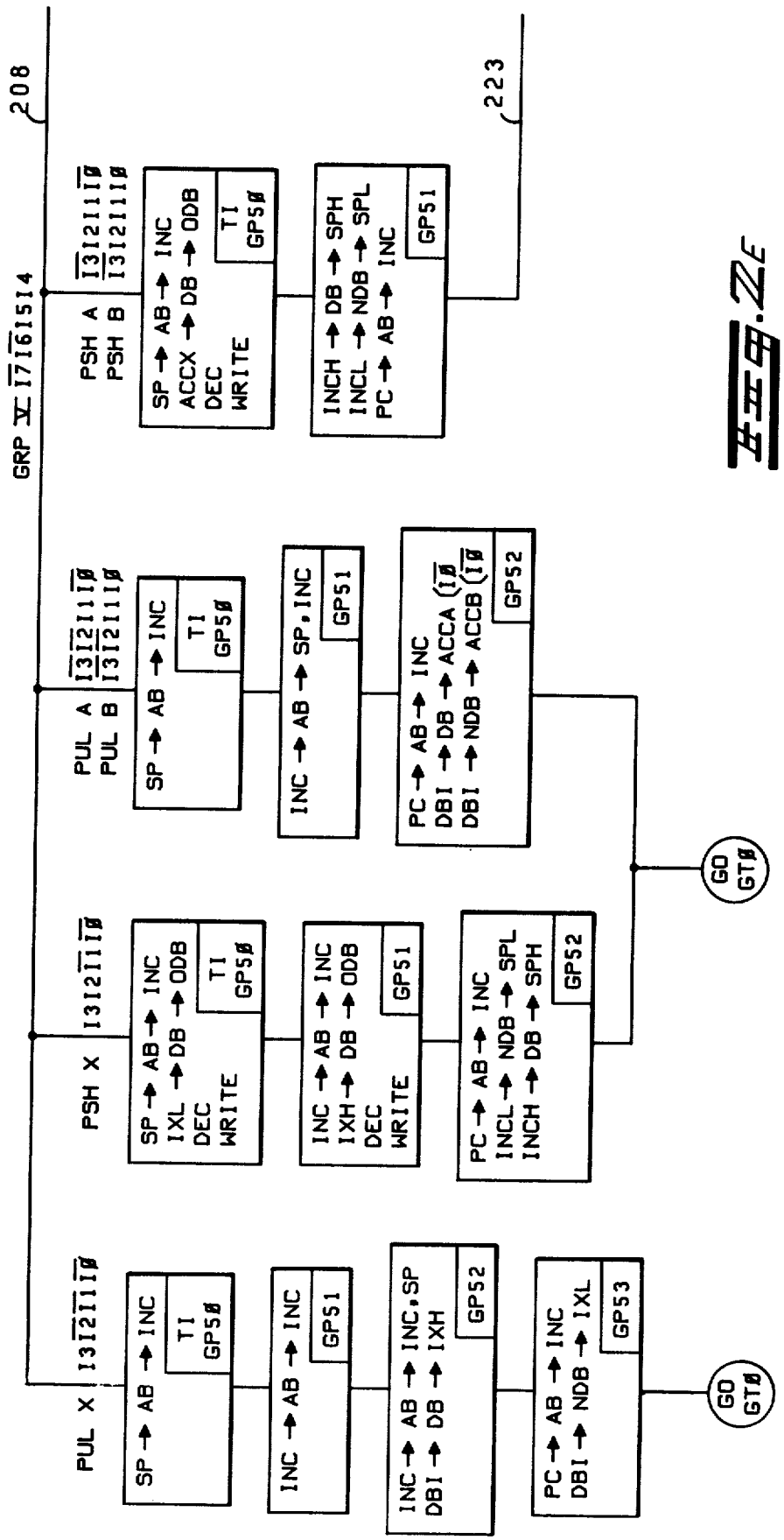

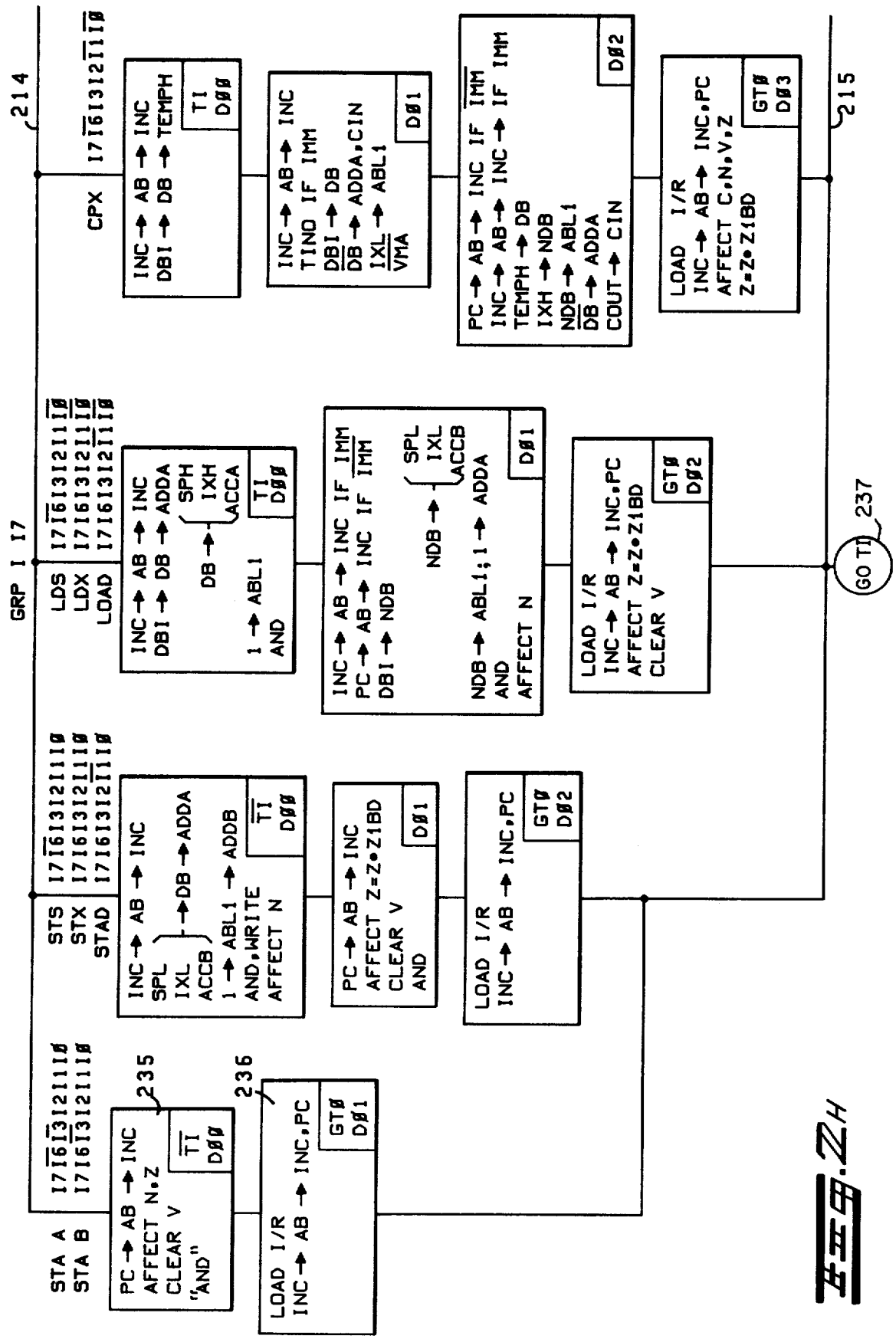

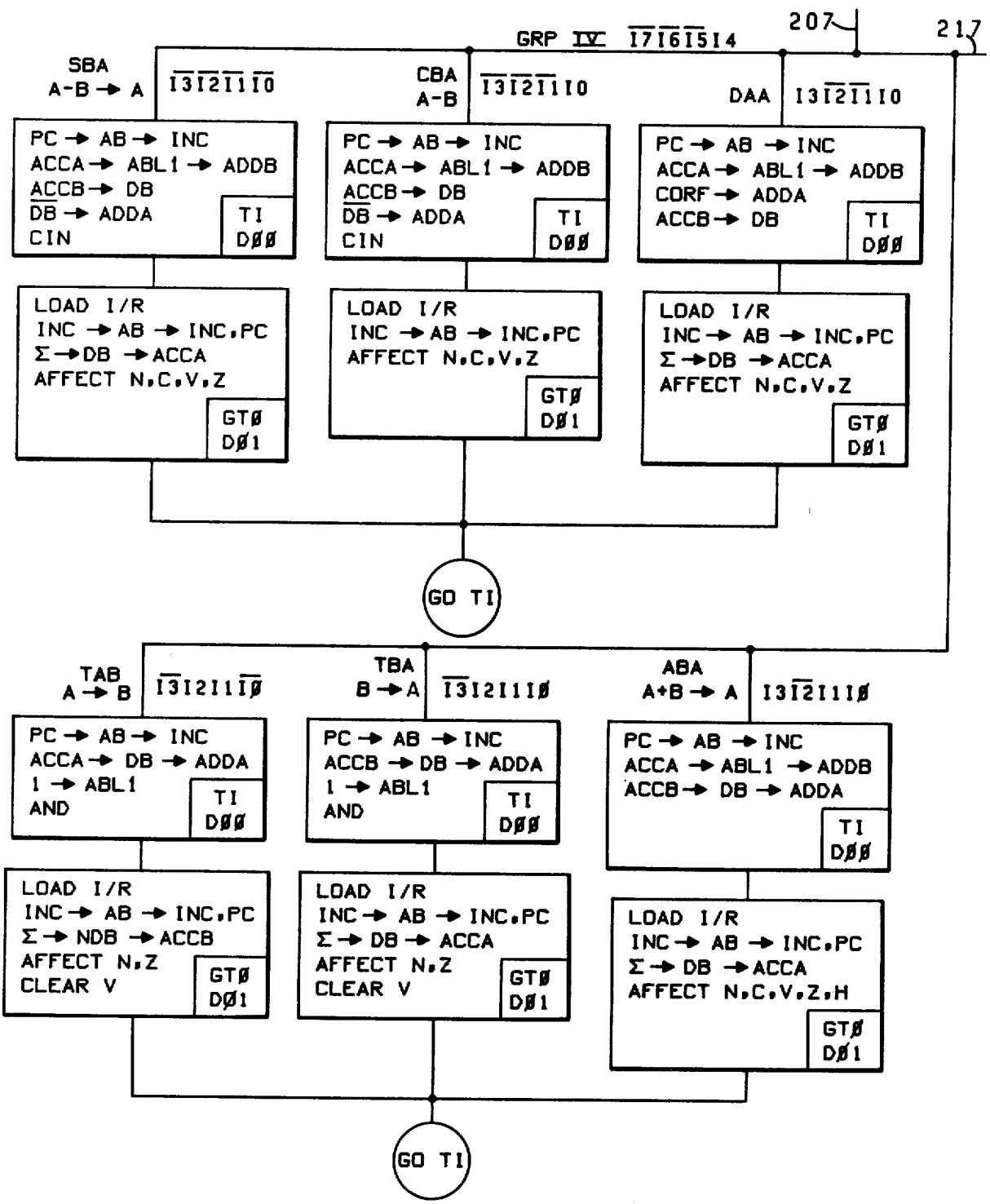

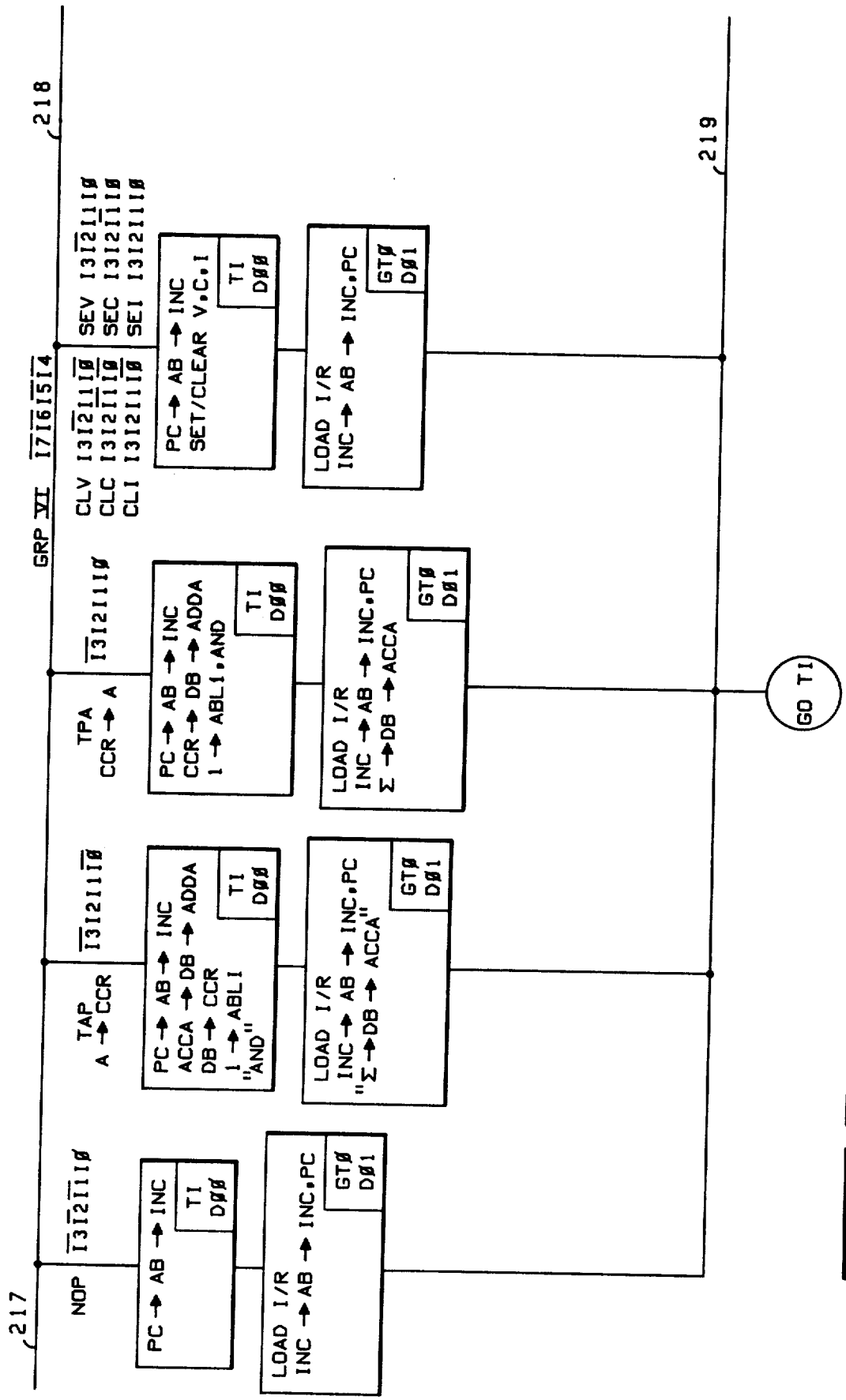

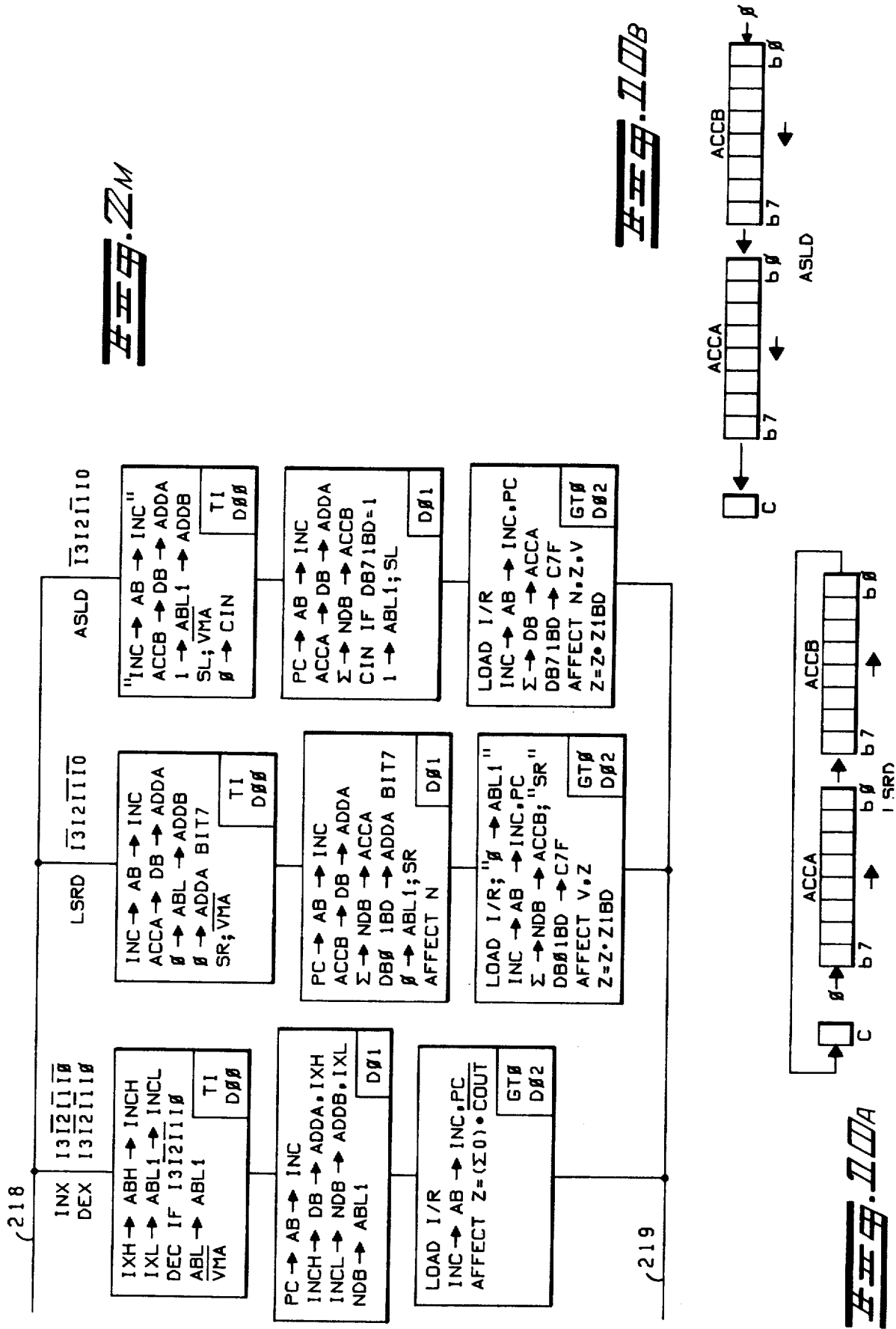

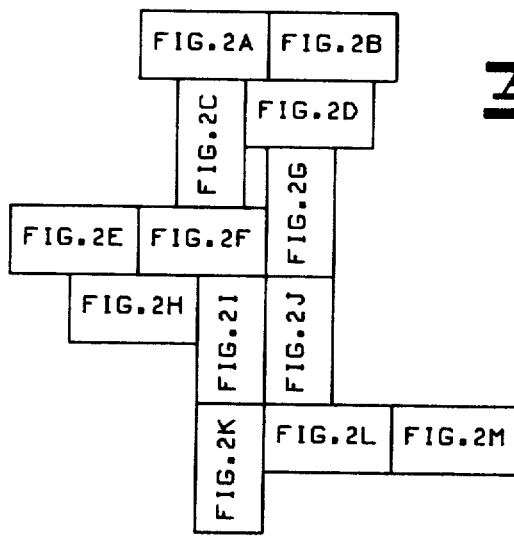

Fig. 3

OP CODE MAP

| LSB \ MSB | 0000 0 | 0001 1 | 0010 2 | 0011 3 | 0100 4 | 0101 5 | 0110 6 | 0111 7 | 1000 8 | 1001 9 | 1010 A | 1011 B | 1100 C | 1101 D | 1110 E | 1111 F |
|---|---|---|---|---|---|---|---|---|---|---|---|---|---|---|---|---|
| | IMPLIED/RELATIVE | | | | ACC A | ACC B | IND | EXT | IMM (ACC A) | DIR | IND | EXT | IMM (ACC B) | DIR | IND | EXT |
| 0000 0 | | SBA | BRA | TSX | NEG | | | | SUB | | | | | | | |
| 0001 1 | NOP | CBA | BAN | INS | | | | | CMP | | | | | | | |
| 0010 2 | | | BHI | PULA | | | | | SBC | | | | | | | |
| 0011 3 | | | BLS | PULB | COM | | | | SUBD | | | | ADDD | | | |
| 0100 4 | LSRD | | BCC | DES | LSR | | | | AND | | | | | | | |
| 0101 5 | ASLD | | BCS | TXS | | | | | BIT | | | | | | | |
| 0110 6 | TAP | TAB | BNE | PSHA | ROR | | | | LDA | | | | | | | |
| 0111 7 | TPA | TBA | BEQ | PSHB | ASR | | | | | STA A | | | | STA B | | |
| 1000 8 | INX | | BVC | PULX | ASL | | | | EOR | | | | | | | |
| 1001 9 | DEX | DAA | BYS | RTS | ROL | | | | ADC | | | | | | | |
| 1010 A | CLV | | BPL | ABX | DEC | | | | ORA | | | | | | | |
| 1011 B | SEV | ABA | BMI | RTI | | | | | ADD | | | | | | | |
| 1100 C | CLC | | BGE | PSHX | INC | | | | CPX | | | | LDAD | | | |
| 1101 D | SEC | | BLT | MUL | TST | | | | BSR | JSR | | | | STAD | | |
| 1110 E | CLI | | BGT | WAI | * | | JMP | | LDS | | | | LDX | | | |
| 1111 F | SEI | | BLE | SWI | CLR | | | | | STS | | | | STX | | |

VI IV III V II I

* INC UNTIL RESET

Fig. 4A

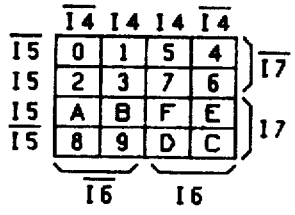

Fig. 4B

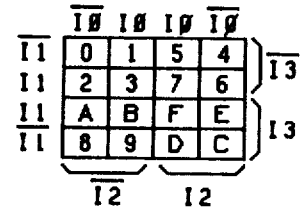

Fig. 4C

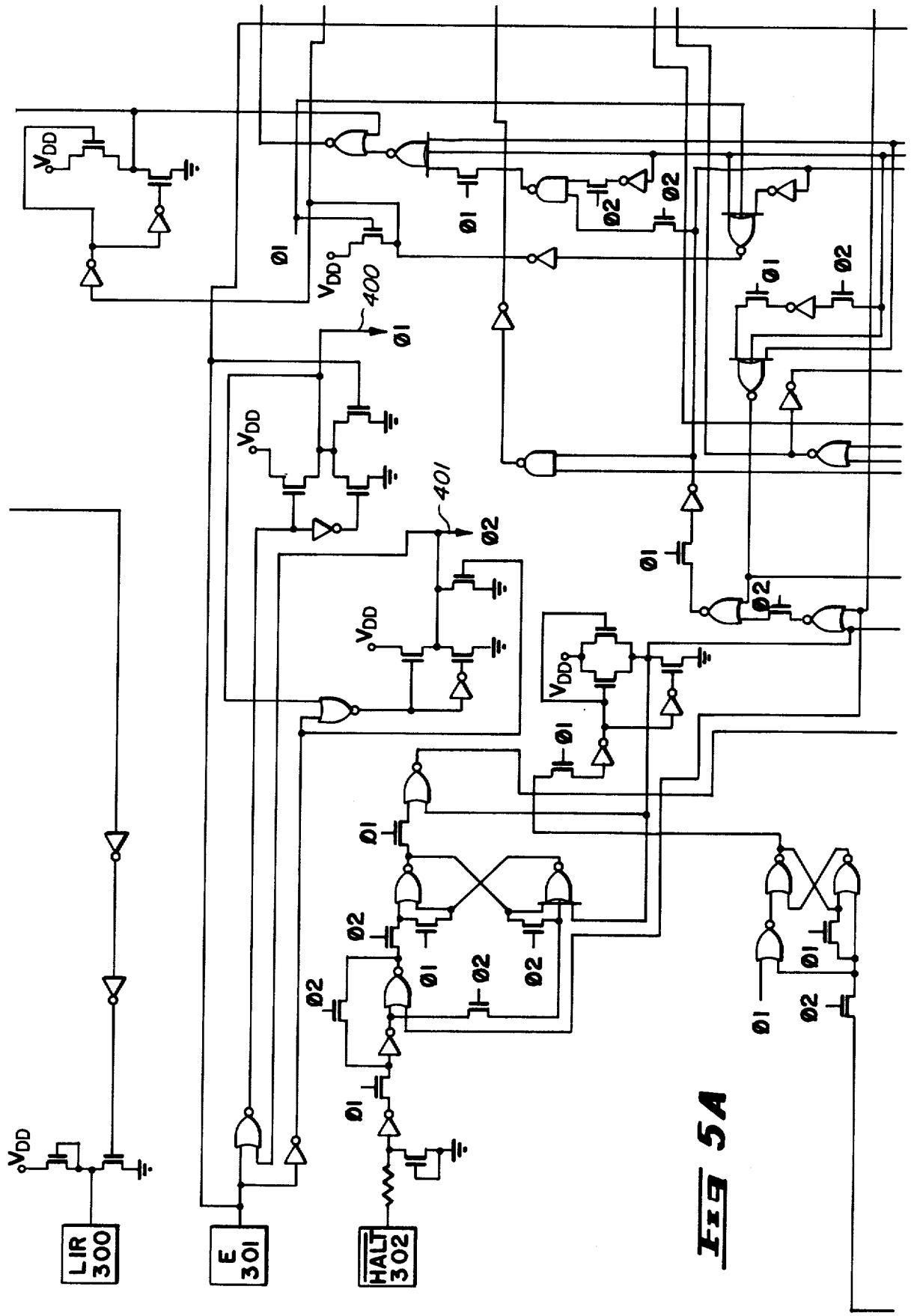

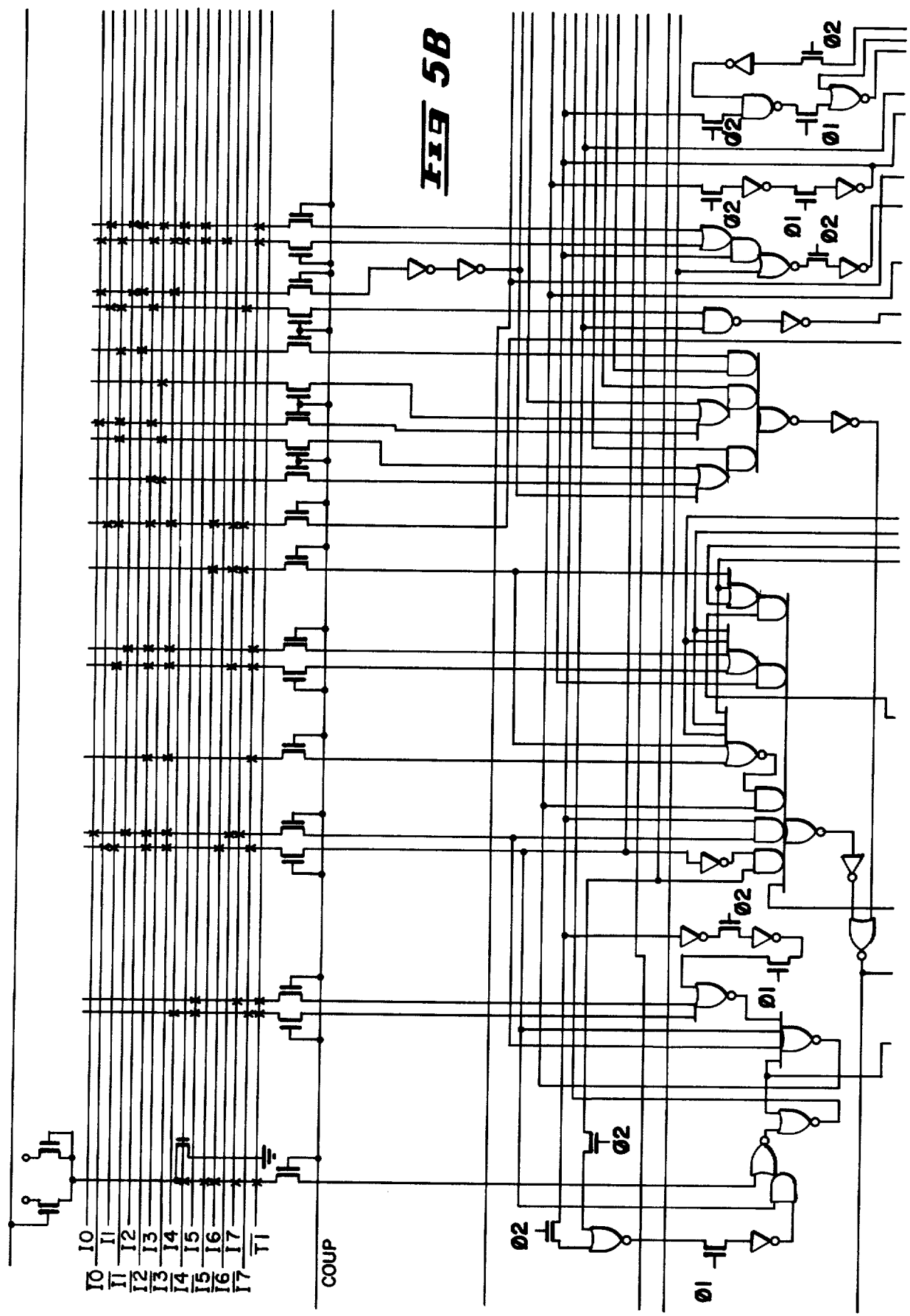

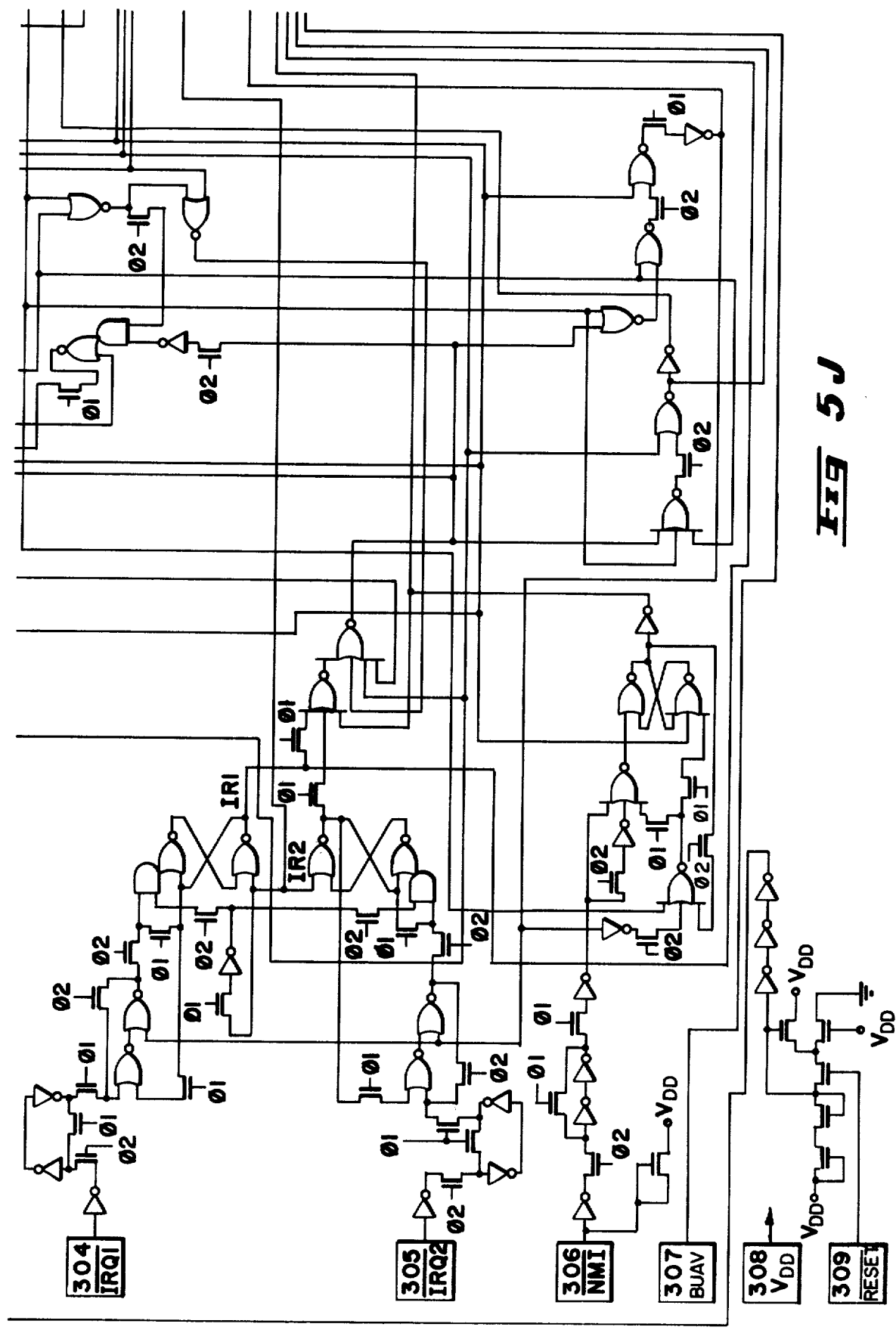

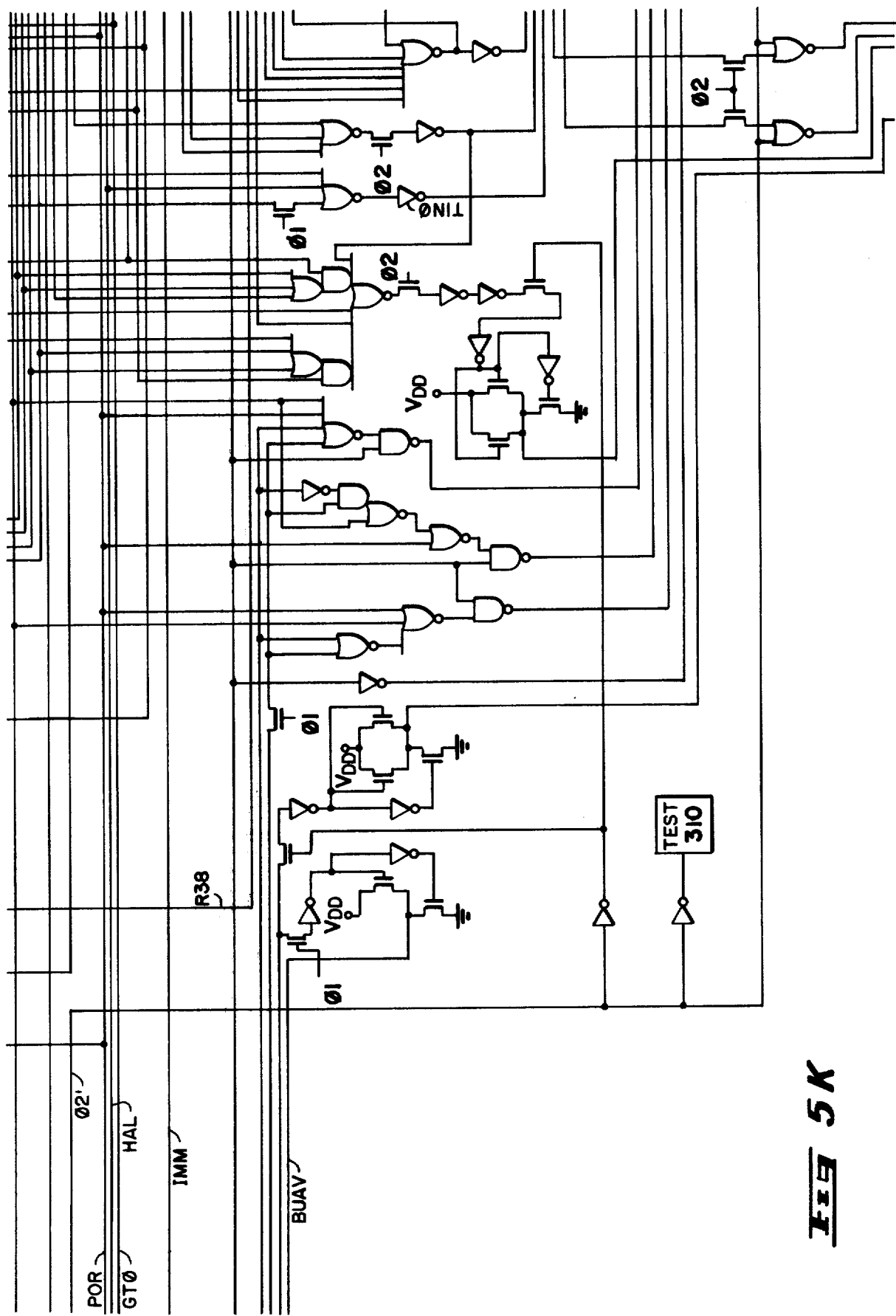

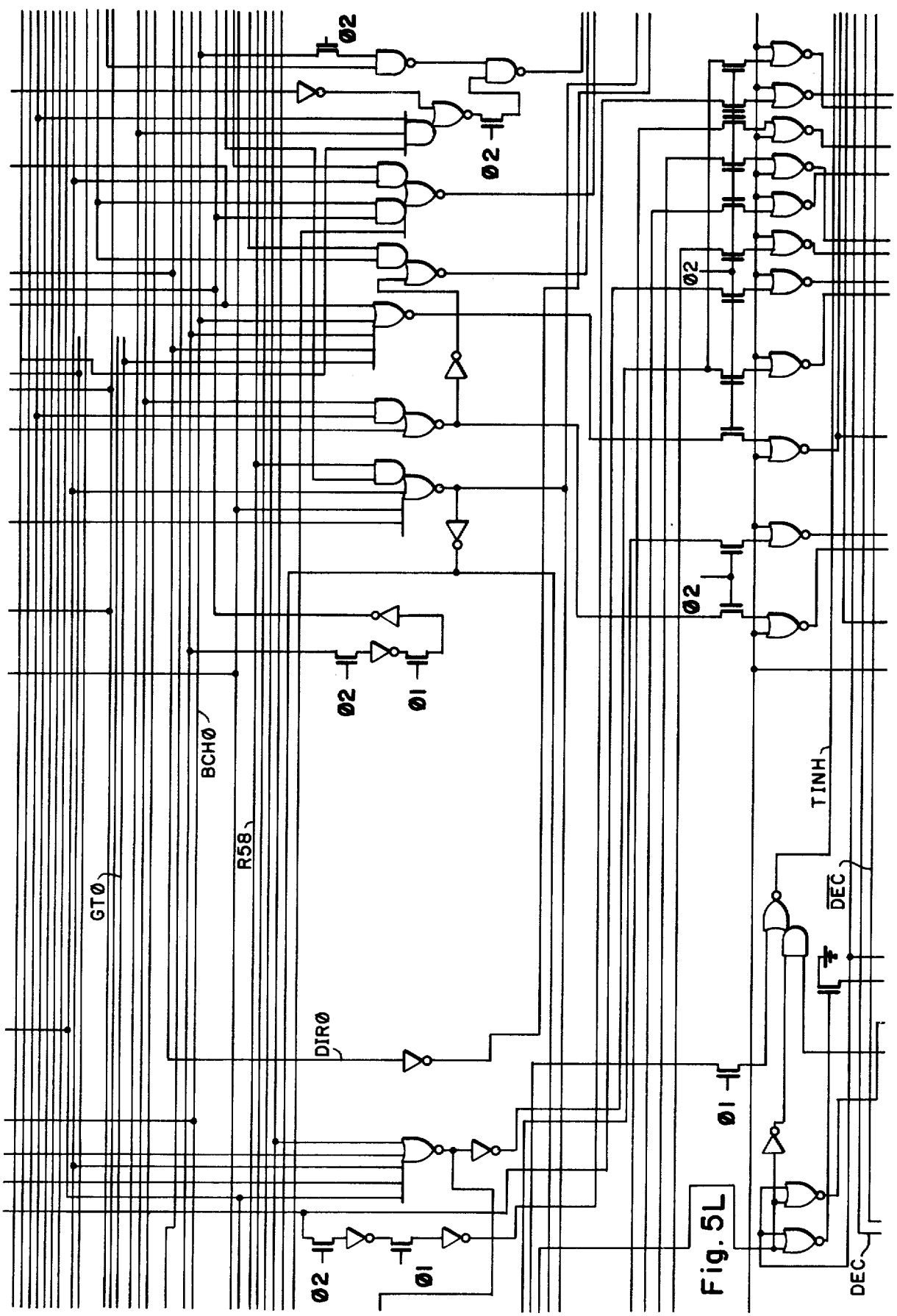

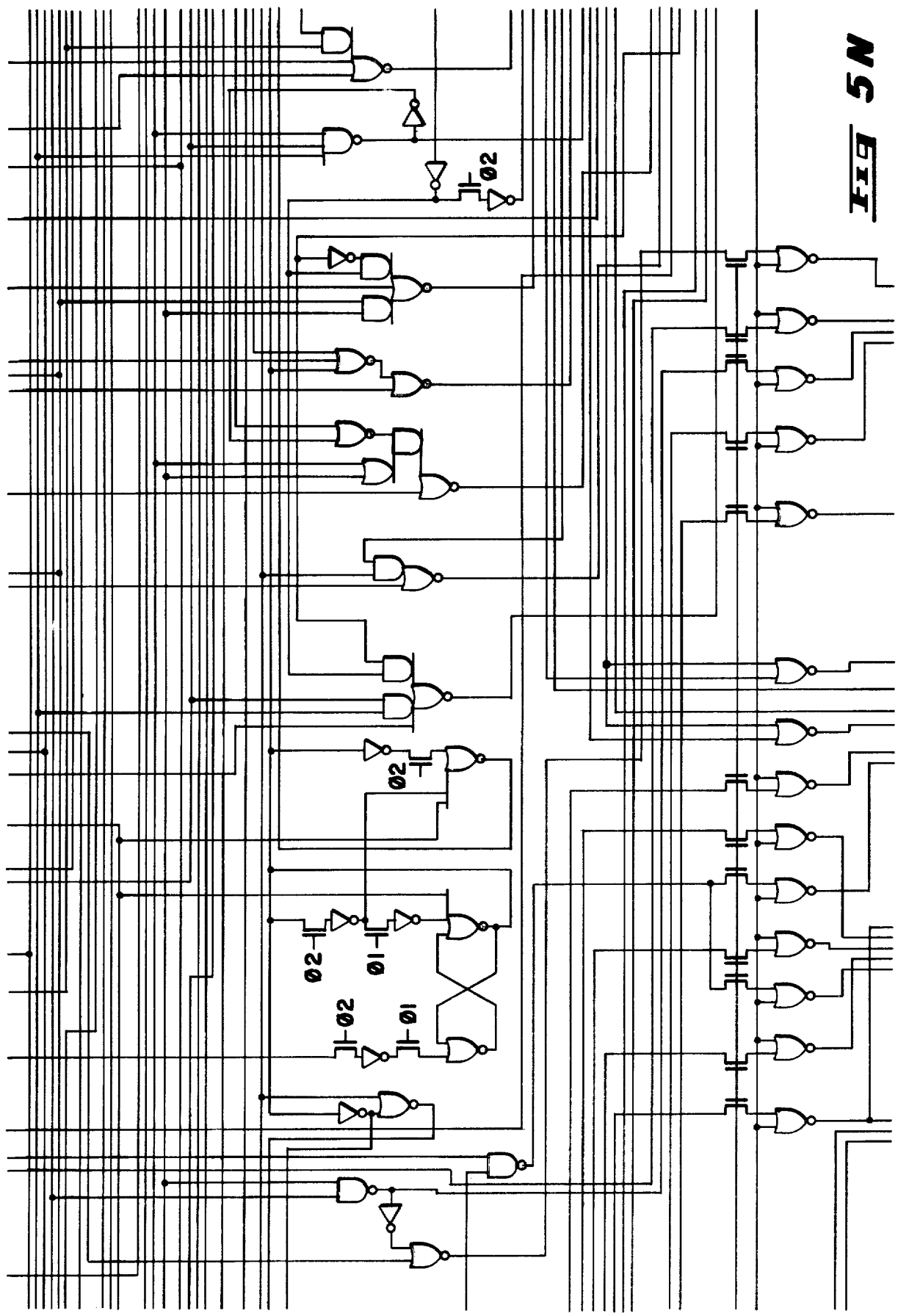

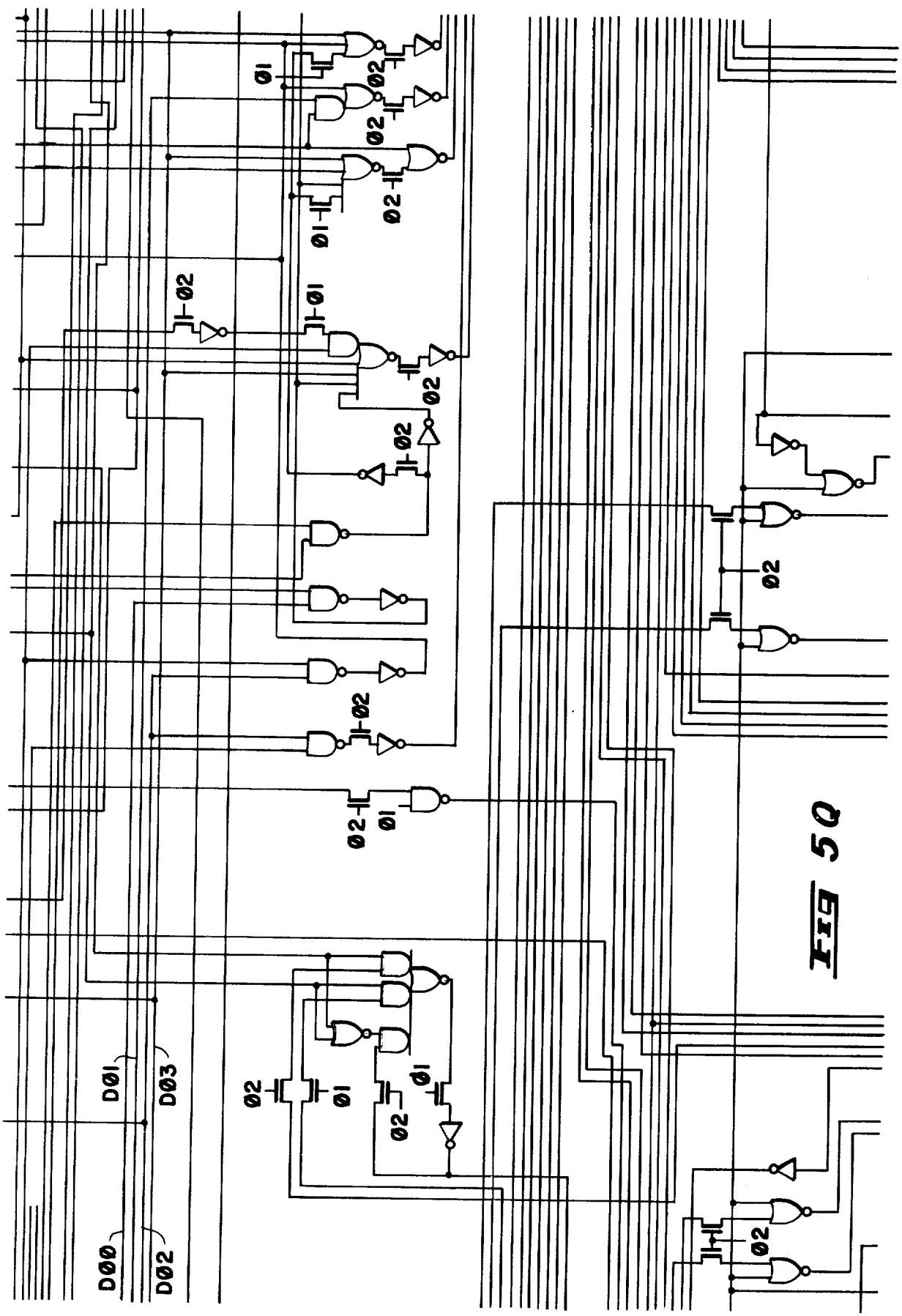

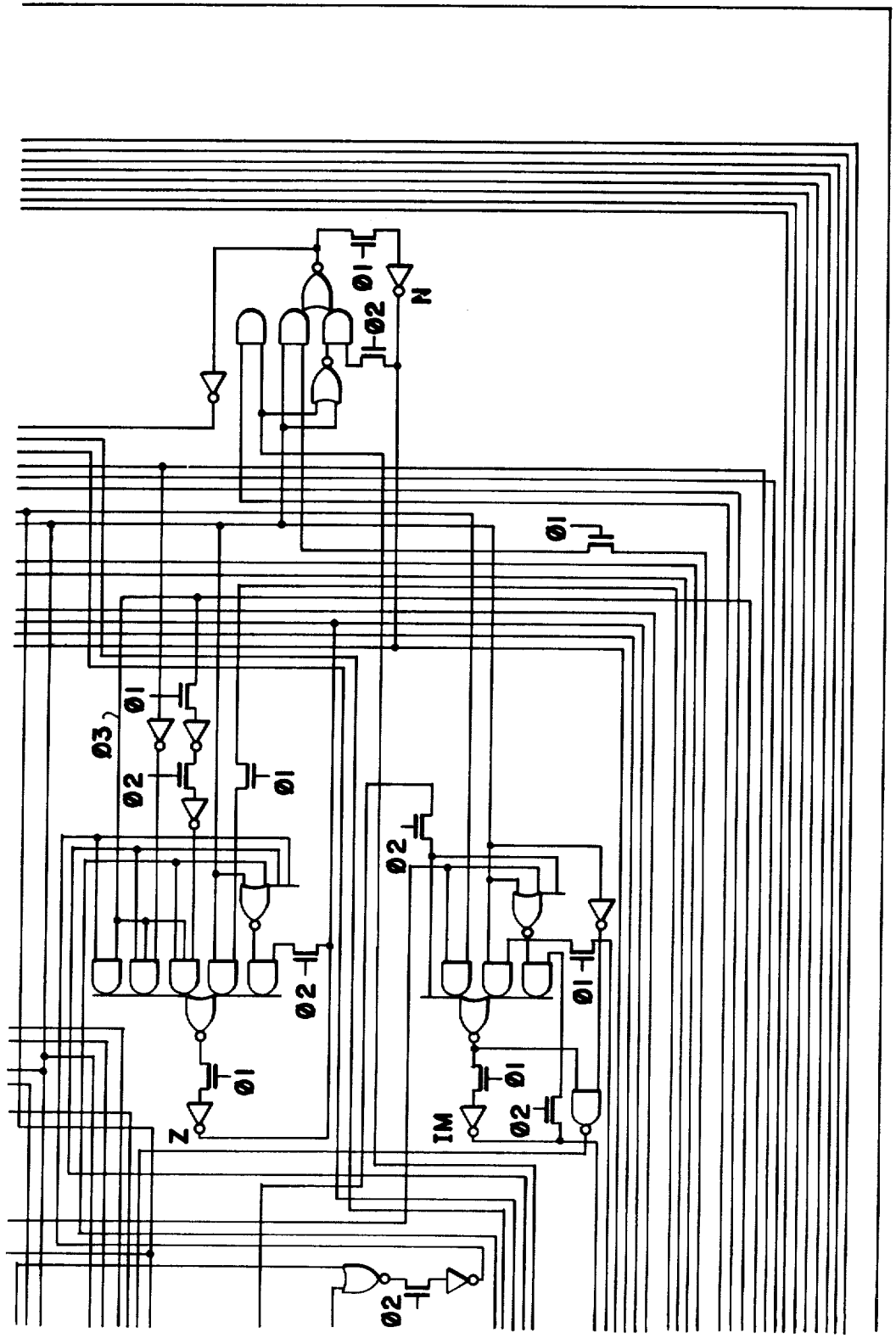

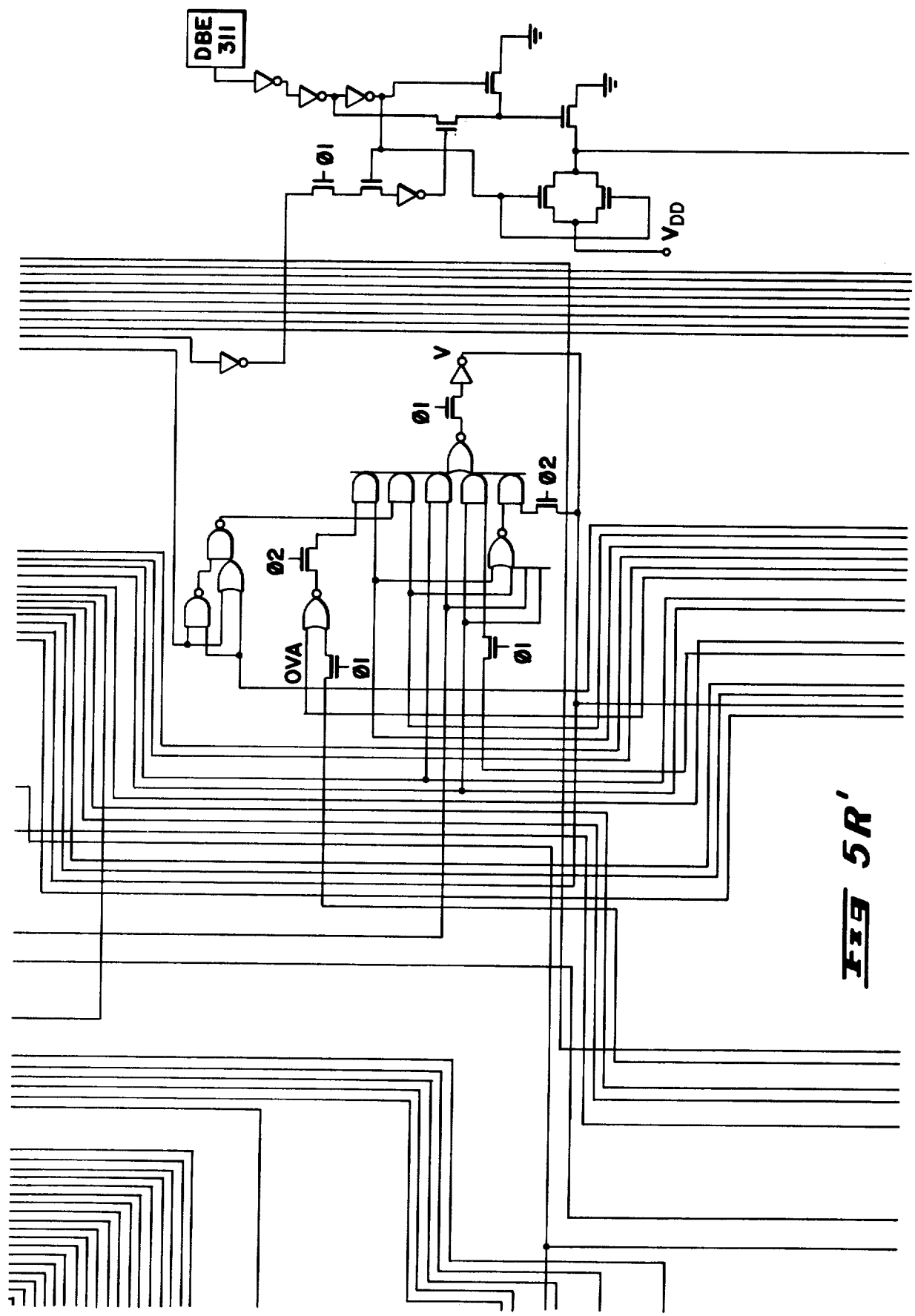

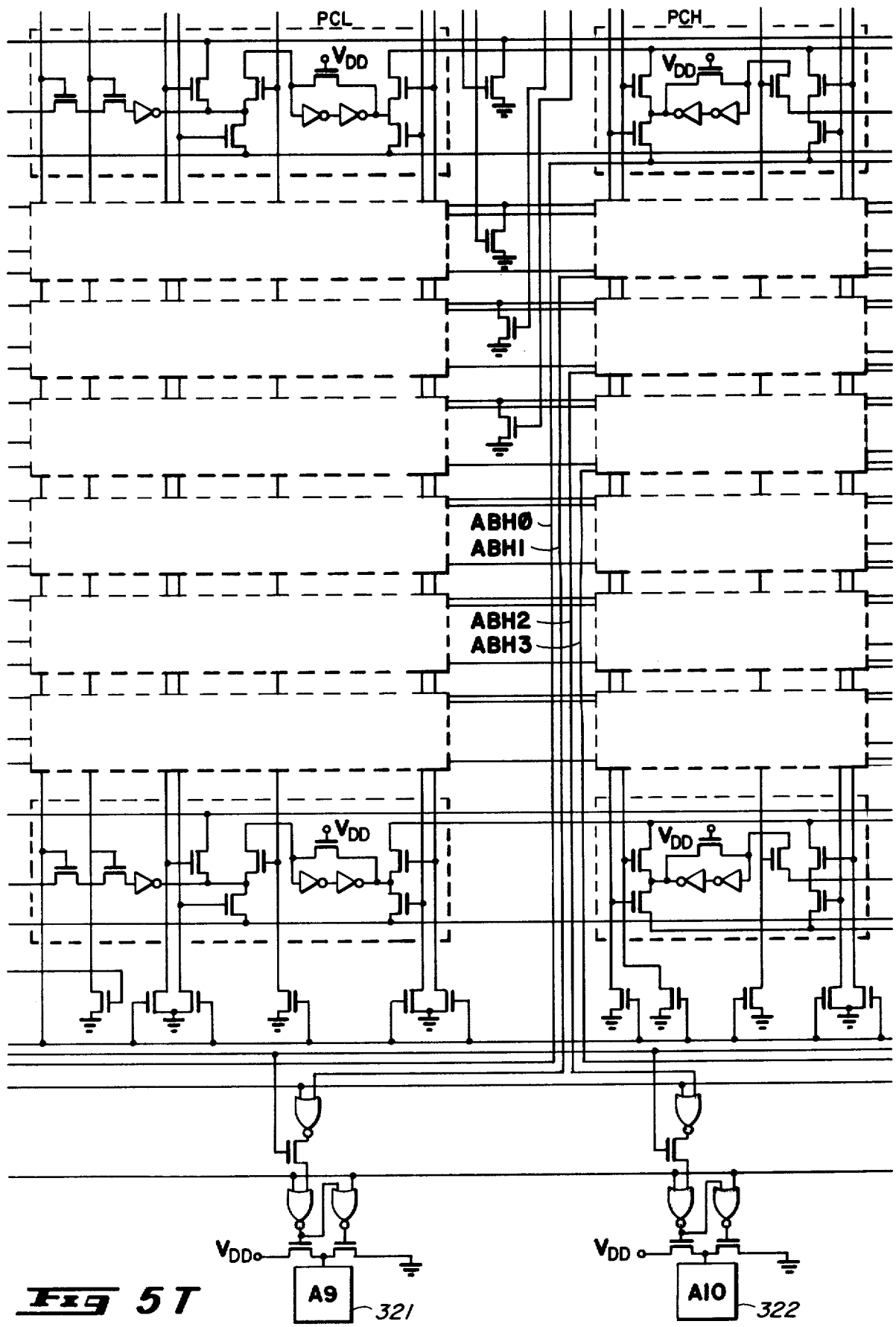

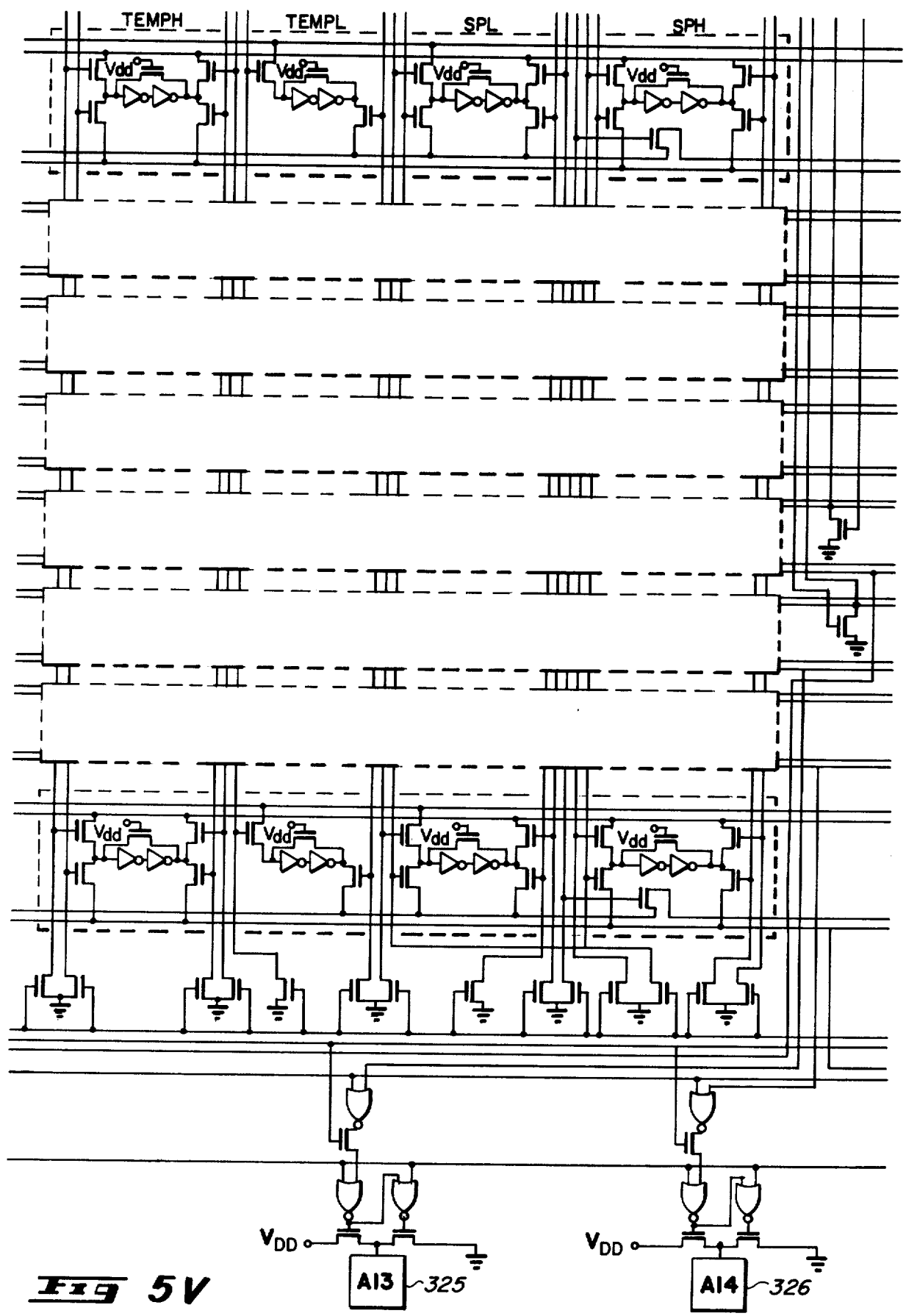

Fig 6

| TIME FRAME | DB | NDB | ABL | INCL | OBL | DBI | IR | PCL | ABL1 | TEMPL |
|---|---|---|---|---|---|---|---|---|---|---|
| GTø |  |  | 2 | 2 | 2 |  | STA | 2 | 1 |  |
| ø2 |  | D1 | D1 | 3 |  | D1 |  |  |  |  |
| T1 | A |  |  | D1 | D1 | D1 |  | 3 |  | D1 |
| ø2 |  |  |  | X |  |  |  |  |  |  |
| Døø |  |  | 3 | 3 | 3 |  |  | 3 |  |  |
| ø2 |  |  |  | 4 |  | NEXT INSTR. |  |  |  |  |

4,266,270

MICROPROCESSOR HAVING PLURAL INTERNAL DATA BUSES

RELATED INVENTIONS (1) Ser. No. 872,857, filed Jan. 27, 1978, now abandoned, of Ritter et al entitled Microprocessor and assigned to the assignee of the present invention.

(2) Ser. No. 873,045, filed Jan. 27, 1978, now abandoned, of Wiles et al entitled Microcomputer and assigned to the assignee of the present invention.

(3) Ser. No. 929,636, filed July 31, 1978, of Harrington et al entitled Processor Interrupt System and assigned to the assignee of the present invention.

(4) Ser. No. 929,482, filed Aug. 2, 1978, of Boney et al entitled Fast Interrupt Method and assigned to the assignee of the present invention.

(5) Ser. No. 939,743, filed on even date herewith, of Groves entitled NRZ/Biphase Microcomputer Serial Communication Logic and assigned to the assignee of the present invention.

(6) Ser. No. 939,744, filed on even date herewith, of Groves entitled Digital Logic For Separating Data and Clock in Manchester-Encoded Data and assigned to the assignee of the present invention.

(7) Ser. No. 939,742, filed on even date herewith, of Groves entitled Microcomputer Wake-Up Logic and assigned to the assignee of the present invention.

(8) Ser. No. 939,724, filed on even date herewith, of Daniels et al entitled Carry Anticipator Circuit and Method and assigned to the assignee of the present invention.

(9) Ser. No. 939,721, filed on even date herewith, of Shaw et al entitled Programmable Mode Select by Reset and assigned to the assignee of the present invention.

(10) Ser. No. 939,725, filed on even date herewith, of Shaw et al entitled FET Voltage Level Detecting Circuit and assigned to the assignee of the present invention.

(11) Ser. No. 939,722, filed on even date herewith, of Daniels et al entitled Data Processor Having Single Clock Pin and assigned to the assignee of the present invention.

(12) Ser. No. 939,723, filed on even date herewith, of Daniels et al entitled Valid Memory Address Pin Elimination and assigned to the assignee of the present invention.

TECHNICAL FIELD

This invention relates generally to the field of data processing and, more particularly, to the internal architecture of a microprocessor.

BACKGROUND ART

Microcomputers are sophisticated, general purpose logic devices which can be programmed to perform a wide variety of useful control functions in industrial and communications equipment, large-scale and medium-scale computer peripheral and terminal hardware, automobiles and other transportation media, amusement and educational devices, and the like. Generally, an entire spectrum of microcomputers is presently available in the commercial marketplace. As the speed of operation, or throughput, of a microcomputer increases, the more valuable and more versatile the microcomputer becomes, since it is able to control a given operation more efficiently and more accurately, or to control a greater number of operations simultaneously, or to control operations requiring relatively fast response times.

The throughput of any given microcomputer is a function of, among other things, the number of machine cycles required to execute a given set of instructions. In the course of designing any computer system, and in particular a microcomputer, a set of instructions is selected which will provide the anticipated programming requirements for the projected market in which the computer system is to be used. The microprocessor, or processor component of a single-chip microcomputer, executes each instruction as a sequence of machine cycles, with the more complex instructions consuming a greater number of machine cycles. The operation of the internal registers and gating circuitry of the microprocessor is synchronized by means of a master clock signal applied to the microprocessor. The master clock signal may actually comprise two or even four clock components; i.e., the microprocessor clock may be two-phase or four-phase. During the basic clock cycle known as the machine cycle, a number of internal processor-related operations may take place simultaneously, including the transfer of digital information from a bus to a register or vice versa, between certain registers, from an address or data buffer to a bus or vice versa, and so forth, or the individual conductors of a bus may each be set to a predetermined logic level, or the contents of a register may be set to a predetermined logic level. The more processor operations occurring within an individual machine cycle the fewer the number of machine cycles required for the execution of a particular instruction. Thus it is desirable to maximize to the extent possible the number of internal processor operations occurring within a given machine cycle.

The MC6800 microprocessor commercially available from Motorola, Inc. is a prior art microprocessor device which has found wide commercial acceptance. The aforementioned microprocessor includes a number of features intended to minimize the number of machine cycles per instruction, including those features described in U.S. Pat. Nos. 4,030,079, 4,016,546, 4,040,035, 4,032,896, and 3,962,682. While the throughput of the MC6800 has been found satisfactory for many applications, any significant improvement in the throughput of such microprocessor would enhance its commercial acceptance for the reasons given above.

In addition to the need to increase microprocessor throughput by minimizing the number of machine cycles per instruction execution, it is desirable to provide a microprocessor with structure which facilitates the addition of new instructions to the microprocessor instruction set.

BRIEF SUMMARY OF THE INVENTION

It is an object of the present invention to minimize the number of machine cycles performed by a microprocessor in executing certain instructions.

It is another object of the present invention to significantly increase the throughput of a microprocessor.

It is a further object of the present invention to provide an additional path for the transfer of digital information in a microprocessor to enable a greater number of internal processor operations to take place simultaneously.

It is yet another object of the present invention to provide a microprocessor having an enhanced architecture which permits faster execution of certain instructions in a present instruction set and which facilitates the expansion of the present instruction set to include new instructions.

These and other objects of the invention are achieved in accordance with a preferred embodiment of the invention by providing in a microprocessor a data bus for transferring digital information, an address bus, a plurality of registers coupled between the data bus and the address bus for storing digital information to effect operation of the microprocessor, an arithmetic logic unit coupled between the data bus and the address bus for performing computations on digital information to effect operation of the microprocessor, control means coupled to the registers and to the arithmetic logic unit for controlling the operation of the registers and arithmetic logic unit, and an additional data bus coupled to at least one of the registers.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a block diagram of a preferred embodiment of the present invention.

FIGS. 2A-2M illustrate an instruction flow chart for the microprocessor shown in FIG. 1 and FIGS. 5A-5AA. FIGS. 2A-2M each represents a section of the entire instruction flow chart, and the sections fit together in the manner shown by FIG. 3.

FIG. 3 shows the interconnection of the individual drawings of FIGS. 2A-2M.

FIGS. 4A-4C illustrate the op code map for the microprocessor shown in FIG. 1 and FIGS. 5A-5AA.

FIGS. 5A-5AA each represents a section of the entire detailed logic diagram, and the sections fit together in the manner shown by FIG. 6.

FIG. 6 shows the interconnection of the individual drawings of FIGS. 5A-5AA.

FIG. 10A illustrates schematically the shifting of data in the A and B accumulators during the LSRD (Logical Double Shift Right) instruction.

FIG. 10B illustrates schematically the shifting of information to the left through accumulators A and B in the ASLD (Logical Double Shift Left) instruction.

DETAILED DESCRIPTION OF THE INVENTION

Figure 2B:
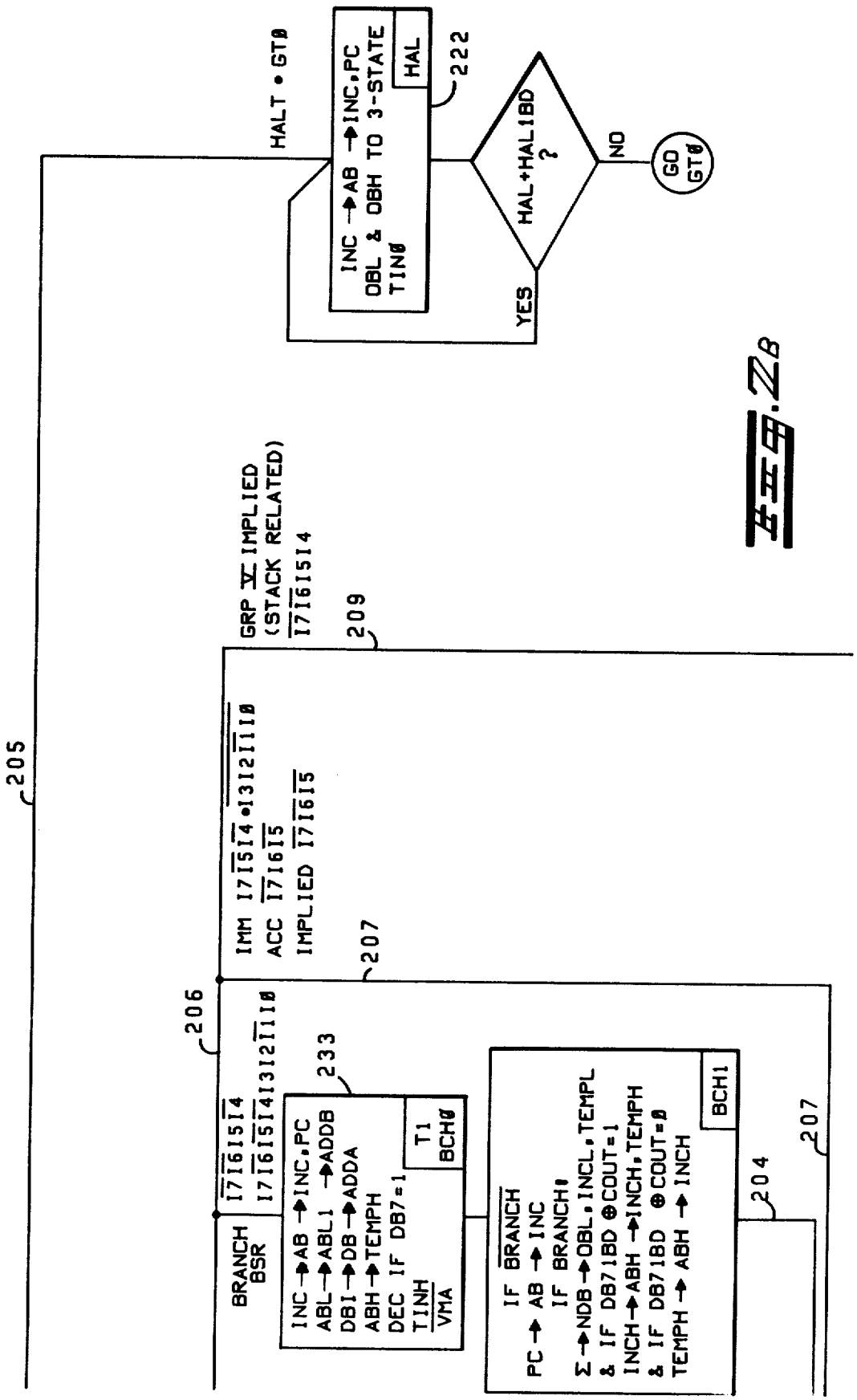

With reference now to FIG. 1, a block diagram of the microprocessor of the present invention is shown. It will be understood that the term "microprocessor" as used herein is not limited to a single-chip microprocessor and can refer, for example, to the processor portion of a single-chip microcomputer. A preferred embodiment of the present invention forms the core processor of the Motorola MC6801 microcomputer and is available as well as a single-chip microprocessor of limited commercial distribution.

FIG. 1 illustrates the internal architecture of the microprocessor and defines the structural and functional relationships between the various registers, address buses, data buses, the arithmetic logic unit (ALU), and other internal logic elements used to control the transfer of digital information within the microprocessor.

Microprocessor 1 includes a first plurality of registers, including INCL 13, the low-order incrementor register; PCL 15, the low-order program counter; TEMPL 17, the low-order temporary register; SPL 19, the low-order stack pointer; IXL 21, the low-order index register; ACCB 22, the B accumulator; and ACCA 24, the A accumulator. A second plurality of registers comprises INCH 12, the high-order incrementor; PCH 14, the high-order program counter; TEMPH 16, the high-order temporary register; SPH 18, the high-order stack pointer; and IXH 20, the high-order index register.

INCH 12 and INCL 13 form the 16-bit incrementor INC which updates the current program address contained in the 16-bit program counter PC, comprising PCH 14 and PCL 15, by incrementing or decrementing its contents. Incrementor INC may also function as an auxiliary register or as an up-down counter or incrementor/decrementor of other registers connected to the address or data buses. INCL 13 may load its contents directly to PCL 15 over bus 11, and INCH 12 may load its contents directly into PCH 14 over bus 11'.

The 16-bit temporary register TEMP comprises TEMPH 16 and TEMPL 17 for temporarily storing digital information within microprocessor 1. The stack pointer SP comprises SPH 18 and SPL 19 and contains the address of the next available location in a push-down/pop-up stack in an associated memory unit (not shown). The 16-bit index register IX, comprising IXH 20 and IXL 21, stores digital information utilized in the indexed mode of memory addressing.

Accumulator ACCB 22 is an 8-bit register which includes logic gates (indicated generally as SR) which permit the contents of ACCB 22 to be shifted to the right one bit position. Accumulator ACCA 24 is also an 8-bit register, and may be used in conjunction with ACCB 22 to store double-precision data. Correction factor (CORF) logic 26 is coupled to ACCA 24 and generates an 8-bit correction factor to ALU 28 to correct arithmetic operations performed on binary coded decimal (BCD) data. The arithmetic logic unit (ALU) 28 has a first input A which can be selectively coupled to either DB bus 6 or the output of CORF 26. A second input B of ALU 28 is coupled to ABL 1 bus 4. ALU 28 has an output terminal $\epsilon$ which can be selectively coupled to either DB bus 6 or NDB bus 8.

A condition code register CCR 30 is also coupled to ALU 28 for temporarily storing various conditions generated by an ALU operation such as carry-borrow, overflow, result equal to zero, result negative, interrupt mask, and a half-carry from the least significant four bits of the result.

The first plurality of registers, including INCL 13, PCL 15, TEMPL 17, SPL 19, IXL 21, ACCB 22, and ACCA 24, are coupled to one or the other portions of the low-order internal address bus comprising ABL 2 and ABL1 4. Switch SW 3 separates ABL 2 and ABL1 4 between SBL 19 and IXL 21. Switch SW 9 separates the ABL 1 bus 4 and the NDB bus 8. In addition, INCL 13, TEMPL 17, SPL 19, IXL 21, ACCB 22, and ACCA 24 are coupled to NDB bus 8. Register PCL 15 is coupled between ABL 2 and DB 6. Registers SPL 19, IXL 21, ACCB 22, and ACCA 24 are also coupled to DB bus 6.

A second plurality of registers, comprising INCH 12, PCH 14, TEMPH 16, SPH 18, and IXH 20, are connected between the high-order address bus ABH 10 and DB bus 6. Additionally, IXH 20 is coupled to NDB bus 8. The low-order address bus ABL 2 drives output buffers designated generally by OBL 32, which in turn drive eight address bus output lines $A\phi$–7 comprising external low-order address bus 34. OBL 32 may also be driven by NDB bus 8. The high-order internal address bus ABH 10 drives a plurality of high-order output buffers OBH which in turn drive address bus output lines A8–15 comprising external high-order address bus 33.

An external data bus 46 comprises 8 data lines $D\phi$–7 driven by data bus out (DBO) buffers 45 and sensed by data bus in (DBI) buffers 47. The external data bus 46 is used for transferring data to and from external memory and external peripheral devices controlled by microprocessor 1. DBIR 49 is responsive to external data bus 46 for temporarily latching data for presentation to instruction register I/R 50. I/R 50 holds an instruction which is decoded by Decode And Control Logic 40 during an instruction cycle. Decode And Control Logic 40 generates, with appropriate timing, a plurality of control signals over control lines indicated generally as Register And ALU Control Lines 41 to control the transfer of data between the various registers, buses and the ALU in accordance with the particular instruction contained within the I/R 50. DBO 45 is enabled by a signal over control line 23 from data bus enable (DBE) logic 48, which in turn is enabled by an external (DBE) signal over line 25.

I/O Logic 35 is responsive to external signals in the form of Halt, Reset, Non-Maskable Interrupt (NMI), and interrupt requests IRQ1 and IRQ2. I/O Logic 35 generates output control signals to Decode And Control Logic 40 and to bus available (BUAV) buffer 53. I/O Logic 35 also generates a tri-state control signal (TSC) over line 27 to read/write (R/W) buffer 54 and to output address buffers 31 and 32. The TSC signal generated over line 27 causes all of the address lines $A\phi$–15 and the R/W line to go into a very high output impedance mode, the tri-state mode, wherein all driver devices are in an off state.

The R/W output indicates whether the microprocessor 1 is in a Read or Write state. The normal stand-by state of this signal is the Read level. The BUAV output signal is normally in a low state, and when it goes high it indicates that the microprocessor 1 has stopped and that the address bus is available. The Halt input, when in the high state, causes the microprocessor to fetch the instruction address from the incrementor or the program counter and to start execution. When the Halt signal is low, all activity in the microprocessor will be halted at the end of the instruction then currently being executed. The Reset input signal is used to start up the microprocessor operation either initially or after the power-down condition resulting from a power failure.

The non-maskable interrupt (NMI) input signal generates a non-maskable interrupt sequence within the microprocessor. The interrupt request input signals IRQ1 and IRQ2 are used to request that an interrupt sequence be performed within the microprocessor. The microprocessor will wait until it completes the current instruction that is being executed before it recognizes the interrupt request. At that time, if the interrupt mask bit in the Condition Code Register 30 is not set, the microprocessor will begin an interrupt sequence wherein the contents of IX, PC, ACCA, ACCB, and CCR are stored away on the external memory stack. The microprocessor sets the interrupt mask bit high so that no further interrupts may occur. A 16-bit address is loaded that points to a vectoring address which is located in the external memory, and an address loaded at these locations causes the microprocessor to branch to an interrupt routine in the external memory. IRQ1 and IRQ2 have different vector addresses in the external memory, and IRQ1 has priority over IRQ2 if both signals occur simultaneously.

Figures 7, 8, 9:
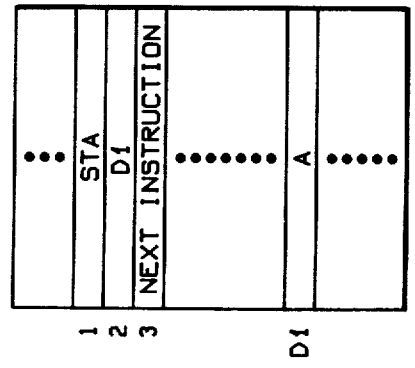
FIG. 7 is a table useful in describing the operation of the microprocessor of FIG. 1 with reference to FIGS. 2A-2M and FIG. 8.
FIG. 8 is a symbolic representation (memory map) of an external memory to which access is made by the microprocessor shown in FIG. 1.
FIG. 9 illustrates the timing relationship between the master clock E and the internally generated microprocessor clocks $\phi 1$ and $\phi 2$.

$V_{DD}$ line 51 is the power supply to microprocessor 1 and will be understood to be distributed throughout the logic circuitry shown in FIG. 1. The voltage supplied is $+5.0$ volts $\pm 5\%$. $V_{SS}$ line 52 is the ground connection to microprocessor 1 and will also be understood to be distributed throughout the logic circuitry shown in FIG. 1. An external clock signal E on line 55 is applied to clock generator (CG) circuitry 60 to generate non-overlapping clock signals $\phi 1$ and $\phi 2$ which are distributed to various timing gates throughout the circuitry comprising microprocessor 1. The clock E is a single phase, TTL compatible clock. The timing relationship between external master clock E and the internally generated clocks $\phi 1$ and $\phi 2$ is illustrated in FIG. 9.

With reference now to the instruction flowchart shown in FIGS. 2A-2M, a symbolic representation of the instruction execution sequence is shown which describes the execution of each instruction of the microprocessor instruction set by setting forth the data transfers between the internal registers, buses, ALU, and buffers during $\phi 1$ of each machine cycle. A machine cycle may be defined as one E clock period during which time both $\phi 1$ and $\phi 2$ each turn on once in a non-overlapping fashion as shown in FIG. 9. In FIG. 2 each block represents the simultaneous data transfers which occur within one particular $\phi 1$ time frame. Several $\phi 1$ time frames are required for the complete execution of any given instruction from the instruction set.

It is important to observe at this point that it is desirable to minimize the number of $\phi 1$ time frames, i.e., machine cycles, per instruction to increase the overall throughput of the microprocessor. As will be seen, this is accomplished in the present invention by increasing the number of internal transfers of digital information during each $\phi 1$ time frame.

In FIG. 2 the line connecting successive $\phi 1$ time frames represents the $\phi 2$ portion of the particular machine cycle. During the $\phi 2$ time frame the contents of the incrementor INC may be incremented or decremented by 1 or otherwise altered. Also during each $\phi 2$ time frame a memory word may be accessed from the associated external memory in accordance with a corresponding memory address sent out over external address lines $A\phi$–15 during the previous $\phi 1$ time frame, and such memory word is received over the external data bus 46 and the data input register DBI 47. It should be noted that a memory read operation may be inhibited by a $\overline{\text{VMA}}$ (no valid memory address) output indicated by the presence of a 1 on each external address line $A\phi$–15, which merely causes a dummy read operation to be performed on the external memory.

FIGS. 2A and 2B show the top portion of the instruction flowchart. The φ1 time frame illustrated by block 220 represents the concluding portion of the immediately preceding instruction, assuming that at the conclusion of execution of such instruction the instruction flowchart called for a return to time frame GTφ represented by block 225. If the Halt input is high at this time, decision box 221 sets the microprocessor in the Halt state represented by time frame HAL in box 222. If the Halt input is low, the operation of the microprocessor continues with time frame GTφ in box 225. In box 225 the arrows (→) indicate the transfer of digital information from the particular piece of microprocessor structure (register, bus, buffer or other logic) indicated on the left side of the arrow to the structure indicated on the right side of the arrow. For example in time frame GTφ the data transfer designated INC→AB→INC, PC indicates that the contents of the incrementor INC is transferred to the internal address bus AB, whereupon it is transferred back to the incrementor INC as well as to the program counter PC. Whenever data is transferred to the internal address bus AB, whether ABH or ABL, or both, it also appears at the corresponding address output buffer, OBH 31 or OBL 32, respectively, from where it is sent out over external address lines 33 or 34 to the external memory.

From time frame GTφ the microprocessor operation procedes to the appropriate T1 time frame, depending upon the particular addressing mode designated by the instruction op code. For example, the internal operation proceeds with the sequences described in box 230 if the direct addressing mode is designated. Box 231 begins the sequence for the extended addressing mode. Box 232 begins the sequence for the indexed addressing mode. Box 233 begins the sequence for a branch operation. For the immediate, accumulator, or implied addressing modes, line 207 is followed to the appropriate T1 or T̄1 box shown in FIGS. 2H-2M corresponding to the particular instruction type. For implied, or stack-related, addressing the procedure follows line 209 to the appropriate T1 time frame shown on FIGS. 2D-2F. Within the particular addressing mode the internal processor operation proceeds through the sequence of φ1 time frames indicated until a decisional box or a return symbol is encountered. The return symbol designates whether return is to be made to time frame GTφ or to a particular T1 time frame as designated by the succeeding instruction.

With reference to the flowchart of FIG. 2, the internal processor operations associated with a typical instruction, for example the STA instruction, will be described below in detail. First, however, to enable one skilled in the art to better understand the instruction flowchart of FIG. 2, the lay-out and nomenclature of FIG. 2 will now be described.

Each block in FIG. 2 has in its lower right-hand corner a smaller block with at least one number therein, for example, GTφ, T1 DIRφ, T1 EXTφ, etc. The designations GTφ and T1 designate the start of certain operational sequences shown in FIG. 2 and are thus referred to by the "return" symbols at the conclusion of each sequence of processor operations represented in FIG. 2. The other alpha-numeric symbols in the smaller blocks of FIG. 2 represent the names of time frames at which the data transfers designated in their corresponding larger blocks occur. Control signals which are given corresponding alpha-numeric designations are generated by the Decode And Control Logic 40 of the microprocessor and provide enabling signals to the various gating circuitry to carry out the desired data transfers. The alpha-numeric designations in the little blocks of FIG. 2 correspond to signals of identical designation indicated in the detailed logic diagram of FIG. 5. The control signals generated by the logic circuit of FIG. 5 corresponding to a particular time frame of FIG. 2 are actually generated one machine cycle later than shown by the particular block in FIG. 2.

The complete instruction set for the microprocessor of the present invention is shown in Table 1. The execution time (in machine cycles) for each of the instructions in Table 1 is set forth in Table 2 according to the particular addressing mode designated for the instruction. One or more addressing modes are available for each instruction and will now be described.

"Accumulator" addressing (ACCX) specifies either accumulator ACCA 24 or ACCB 22 and requires only a single operand. In "immediate" addressing, the operand is contained in the second or second and third bytes of the instruction, and no further addressing of memory is required. The microprocessor addresses this location when it fetches the immediate instruction for execution. In the "direct" mode of addressing, the address of the operand is contained in the second byte of the instruction and permits the lowest 256 bytes of external memory to be directly addressed for the storage of temporary data or intermediate results.

In the "extended" mode of addressing the second byte is used as the high-order address of the operand, and the third byte is used as a low-order operand address, the combined 16 bits constituting an absolute address in the external memory. In "indexed" addressing, the numerical address is variable depending upon the contents of the index register. The contents of the second part of the instruction are added to the low-order index register IXL 21 and any carry is added to the contents of the high-order index register IXH 20. The contents of the index register IX are then used to address the external memory. In "inherent" addressing, the op code itself inherently specifies one or more registers which contain operands or in which results are to be stored. For example, the operator ABA (Add Accumulators) inherently specifies that the two operands are located in ACCA 24 and ACCB 22 and that the result of their addition is to be stored in ACCA 24.

In "relative" addressing, the address contained in the second byte of the instruction is added to the contents of the program counter PC plus 2. This permits the addressing of data within a range of −125 to +129 bytes of the address of the present instruction. The relative addressing mode is used only by the conditional branch instructions, the unconditional branch instruction (BRA) and the branch to subroutine instruction (BSR).

Reference may be had to FIGS. 10A and 10B for a schematic representation of the shifting of data to the right or to the left through shift registers A and B in accordance with the LSRD or ASLD instructions, respectively.

By way of further assistance to one of ordinary skill in understanding the instruction flowchart of FIG. 2, whenever digital information is indicated as being transferred to DB bus 6, it may be assumed that it is also transferred to DBφ 45. In addition, when digital information is transferred to ABL 14, it may be assumed that it is also transferred to the B input to ALU 28.

In FIG. 5, all internal buses are precharged to their high state during the $\phi 2$ time frame. With reference to the INCL register shown in FIG. 5S, a TIN$\phi$ signal (FIG. 5K) inhibits a carry into INCL. Regarding the INCH register shown in FIG. 5U, the TINH signal (FIG. 5L) forces a carry into INCH.

An op code map for the microprocessor of the present invention is shown in FIG. 4A. For a given 8-bit instruction, the most significant bits (MSB) are indicated along the top of FIG. 4A, and the least significant bits (LSB) of the instruction are indicated along the left-hand side of FIG. 4A. In the instruction flowchart shown in FIG. 2 and in the detailed logic diagram of FIG. 5, a particular instruction, or a portion thereof, may be represented symbolically in the form I7 I6 I5 I4 I3 I2 I1 I$\phi$. In this representation, the highest order bit, for example, is assumed to be a 1 if represented by I7 and is assumed to be 0 if represented by $\overline{I7}$. The diagrams shown in FIGS. 4B and 4C, in conjunction with the hexidecimal symbols located along the sides of FIG. 4A, are useful in translating between instructions represented in binary form or hexidecimal form. For example the instruction I7 $\overline{I6}$ $\overline{I5}$ I4 $\overline{I3}$ I2 I1 I0 (the STA instruction in the direct addressing mode) may be represented in binary form as 10010111. Using FIG. 4C, the hexidecimal symbol for the most significant bit is found to be 9, and using FIG. 4B the hexidecimal symbol for the least significant bit is found to be 7, so the STA instruction (direct addressing mode) may be represented hexidecimally as 97.

The execution of the STA instruction in the direct addressing mode will now be described with reference to the instruction flowchart of FIG. 2 in order to point out the advantages of the present invention. The STA instruction (direct addressing mode) was also included in the instruction set of the Motorola MC6800 microprocessor, as shown and described, for example, in U.S. Pat. No. 4,050,096, and required four machine cycles for its execution as shown in Table 9 of the aforementioned patent. By providing an additional data bus NDB 8 in accordance with the present invention, the STA instruction (direct addressing mode) of the instruction set of the MC6801 microprocessor described in the present invention may be executed in only three machine cycles, as will now be shown. Referring first to time frame GT$\phi$ in FIG. 2A, the following data transfers occur:

LOAD I/R (1)

INC→AB→INC, PC (2)

The first data transfer (1) is the loading of the instruction register I/R 50 with the STA op code contained in the first byte of the STA instruction. With reference to FIG. 8, a memory map is shown in which several 8-bit memory locations are symbolically represented in the external random access memory to which memory accesses are made by microprocessor 1 by means of 16-bit memory addresses sent out over external address lines 33 and 34. Let us designate the address of the STA instruction as address location 1. Since the STA instruction in the direct mode of addressing is a 2-byte instruction, the STA instruction occupies memory locations 1 and 2 of the external memory. Memory location 2 contains the address D1 at which the contents of the A accumulator 24 are desired to be stored. Memory location 3 contains the op code of the instruction next to be fetched and executed.

During the second data transfer (2) the contents of the incrementor, INCH and INCL, are transferred to the internal address buses, ABH and ABL, respectively. During the $\phi 2$ time frame immediately preceding the GT$\phi$ time frame it will be understood, as mentioned earlier, that the incrementor INC has been incremented by 1. Since the original contents of the incrementor INC during the $\phi 1$ time frame preceding time frame GT$\phi$ were 1, corresponding to the memory address of the STA instruction, the incremented contents of incrementor INC is 2 at the beginning of time frame GT$\phi$. Reference may be made to FIG. 7, which indicates the information appearing on the buses and within the registers and buffers at each of the $\phi 1$ and $\phi 2$ time frames during the execution of the STA instruction (direct addressing mode). In FIG. 7 only the low-order internal address buses, address buffers, temporary register, and incrementor are shown since for the example described the high-order address byte consists of all zeros. When the contents, 2, of INCL is transferred to ABL in data transfer (2) it is also transferred to OBL to initiate the fetching of the information stored at memory address 2. Also during data transfer (2) the digital information, 2, on ABL is transmitted back to INCL and is also transmitted to PCL. During the $\phi 2$ time frame succeeding time frame GT$\phi$ the incrementor, i.e., INCL, is incremented by 1 to the value 3. In addition, the contents D1 of memory location 2 is fetched from external memory and placed in the data input buffer DBI 47.

The next instruction flowchart time frame is T1 DIR$\phi$ in box 230. Since the STA instruction in the direct addressing mode is represented symbolically as I7 $\overline{I6}$ $\overline{I5}$ I4 $\overline{I3}$ I2 I1 I0 the condition of entry into box 230 (i.e., I7 $\overline{I5}$ I4) has been met. The data transfers occurring during time frame T1 DIR0 are the following:

INC→PC (3)

DBI→NDB→OBL, INCL, TEMPL (4)

$\phi$→ABH→INCH, TEMPH (5)

ACCX→DB→ADDA (6)

1→ABL1→ADDB (7)

AND (8)

WRITE (9)

During data transfer (3) the contents, 3, of INCL 13 is transferred to PCL 15. During data transfer (4) the data D1 at DBI 47 is transferred to NDB bus 8 and from there to OBL 32 to present the address, D1, over external address bus 34 at which the contents of the A accumulator will be stored. Also during data transfer (4) the data D1 on NDB 8 is also transferred to INCL 13 and TEMPL 17.

During data transfer (5) the eight conductors of ABH 10 are set to 0, as are the contents of INCH 12 and TEMPH 16, since in the direct addressing mode only the first 256 words of external memory may be accessed. During data transfer (6) the contents A of either accumulator A or B are transferred to the DB bus 6 and from there to the A input to ALU 28. During data transfer (7) the eight conductors of the ABL1 address bus 4 are set to 1, as are the corresponding B inputs to ALU 28. During data transfer (8) the A and B inputs to ALU 28 are logically "ANDED" together. Lastly, in data transfer (9) the R/W output signal goes low to "write" into memory address location D1 the data A from accumulator A or accumulator B which was transferred to the DB data bus 6, and consequently to the data output buffers 45, during data transfer (6). Thus at the conclusion of data transfer (9) the "execute" portion of the instruction cycle, comprising the storing of the contents of accumulator A or B into memory location D1, has been accomplished. Data transfers (10)–(13) comprise those operations required to fetch the next instruction.

Figure 2C:
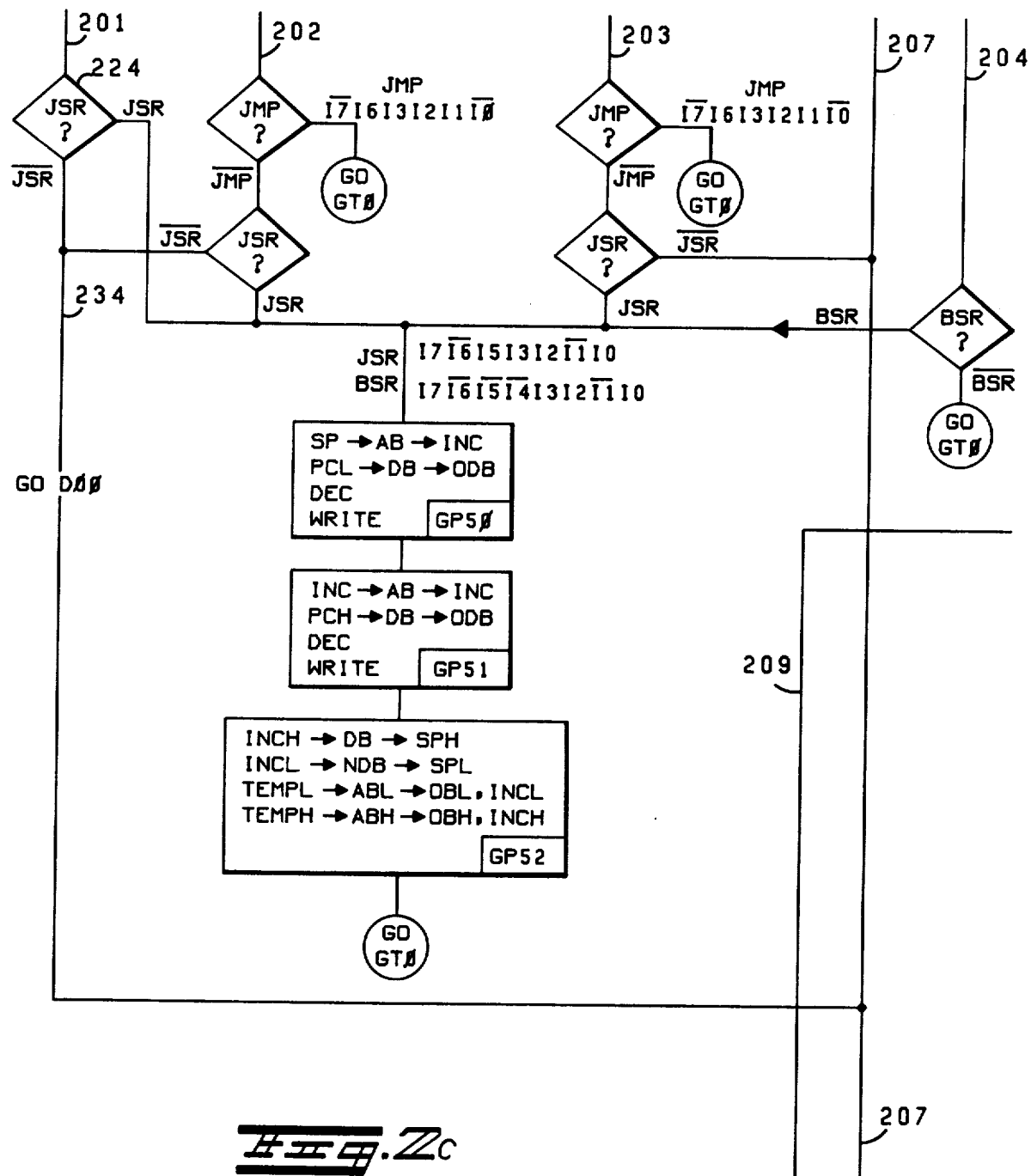
Figure 2F:
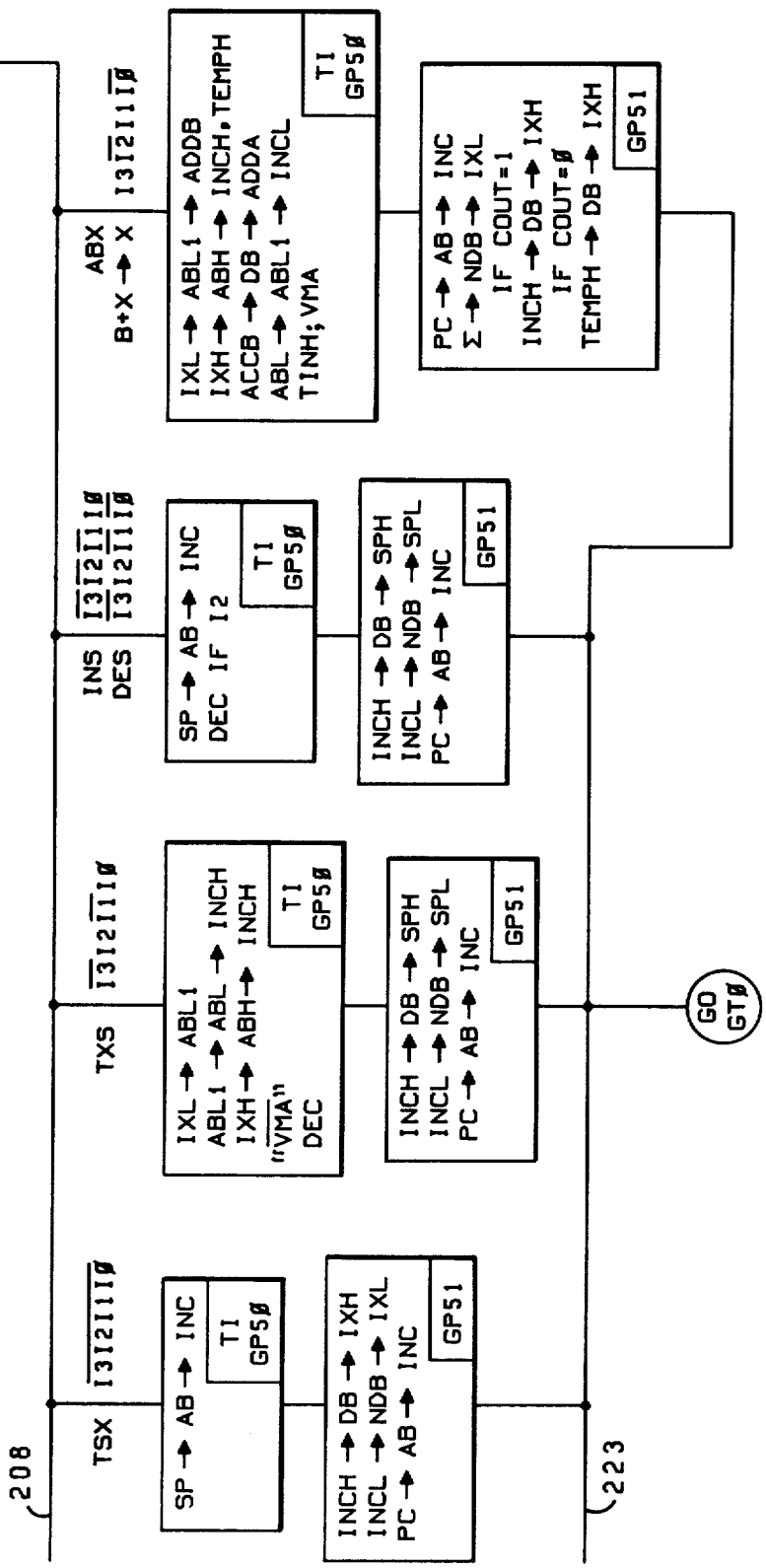
Figure 2G:
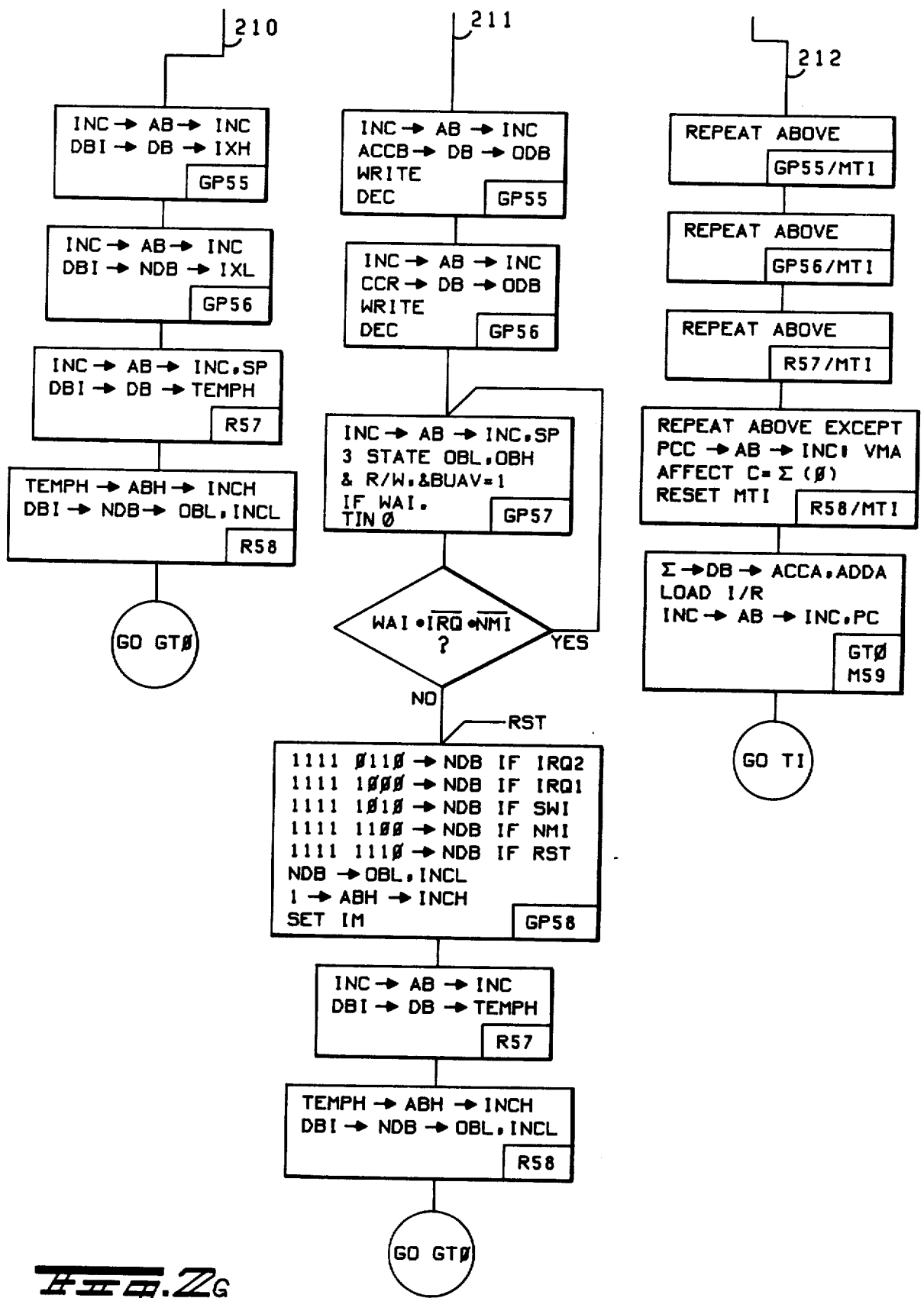
Figure 21:
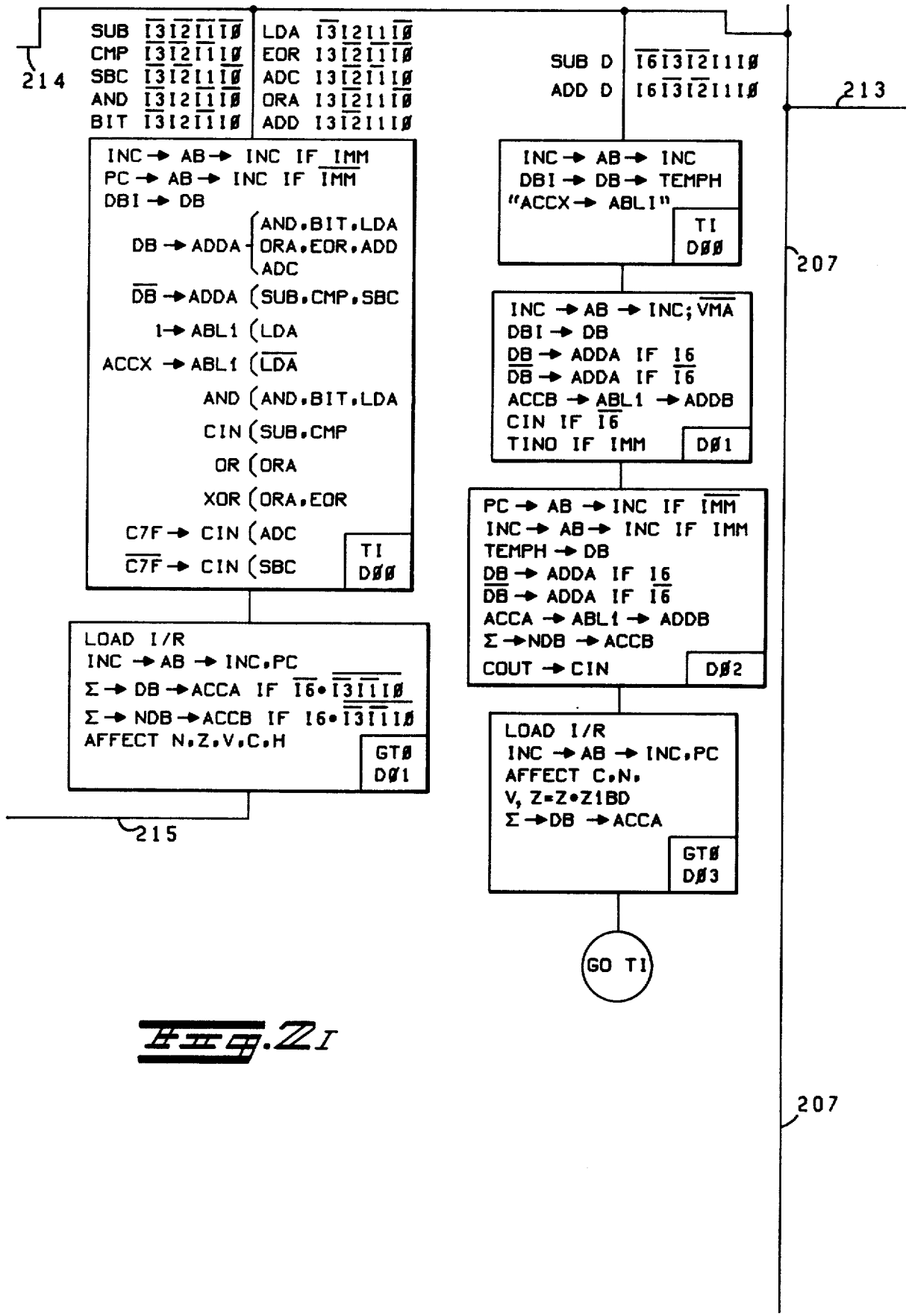
Figure 2J:
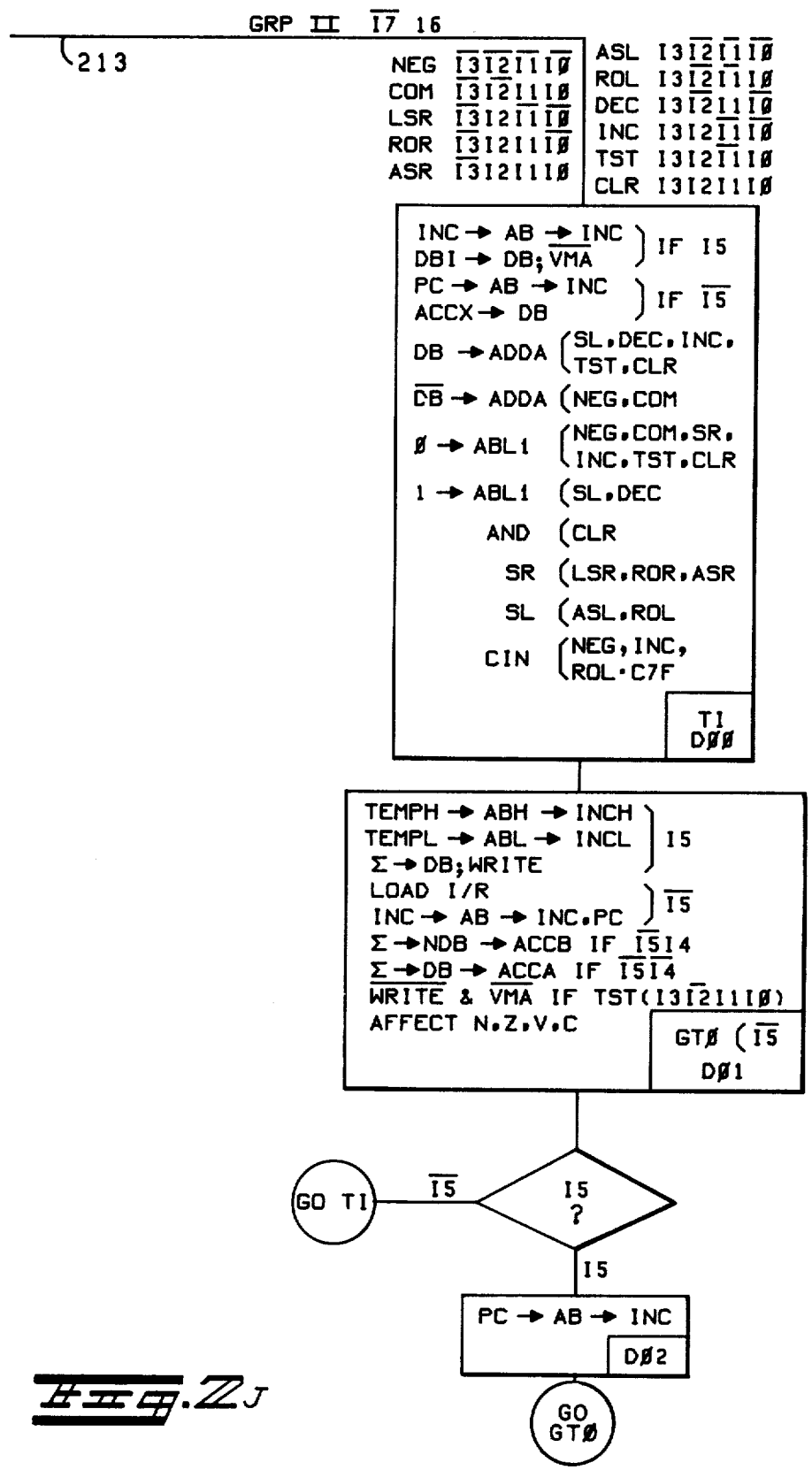
Figure 51:
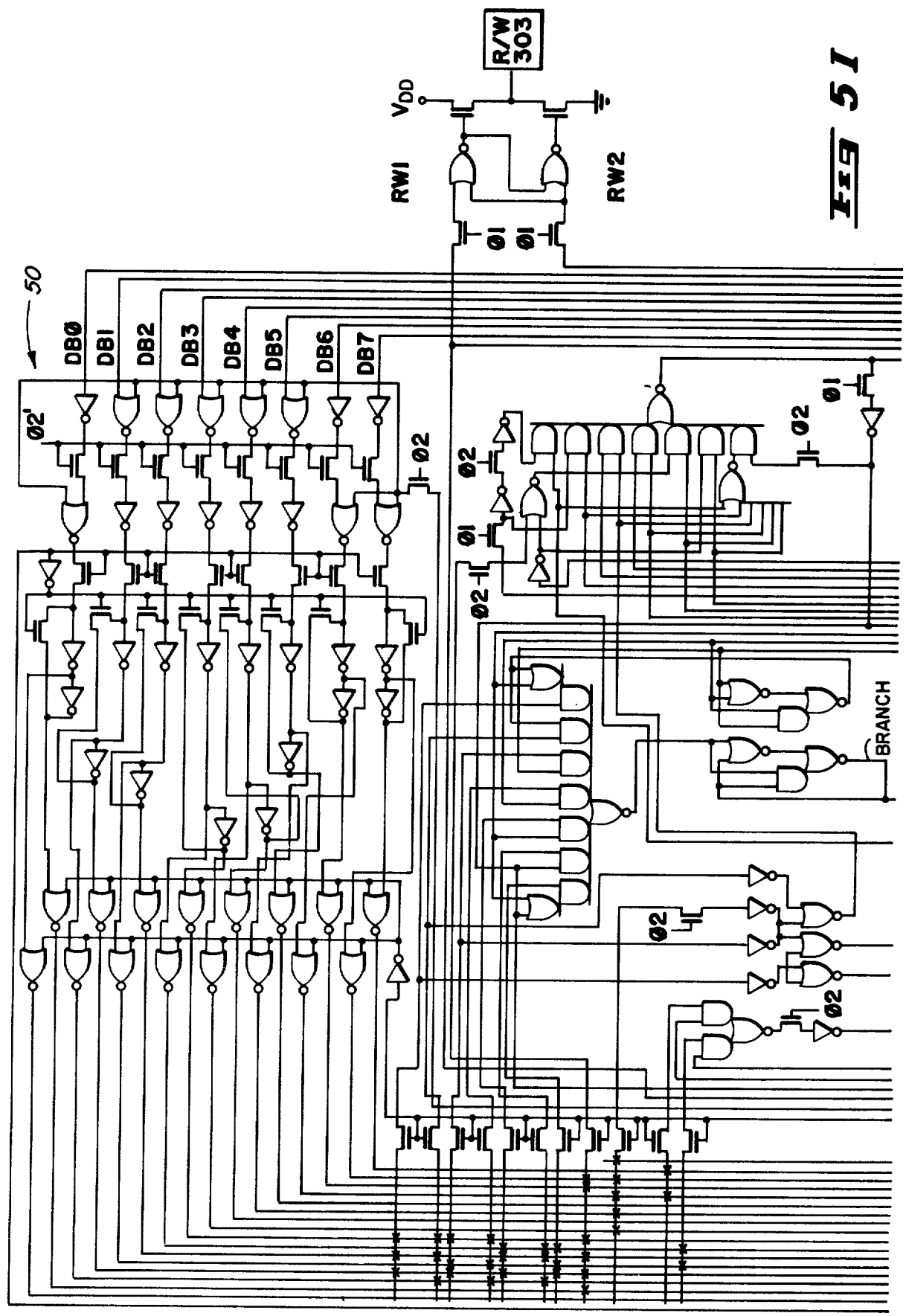
Figure 50:
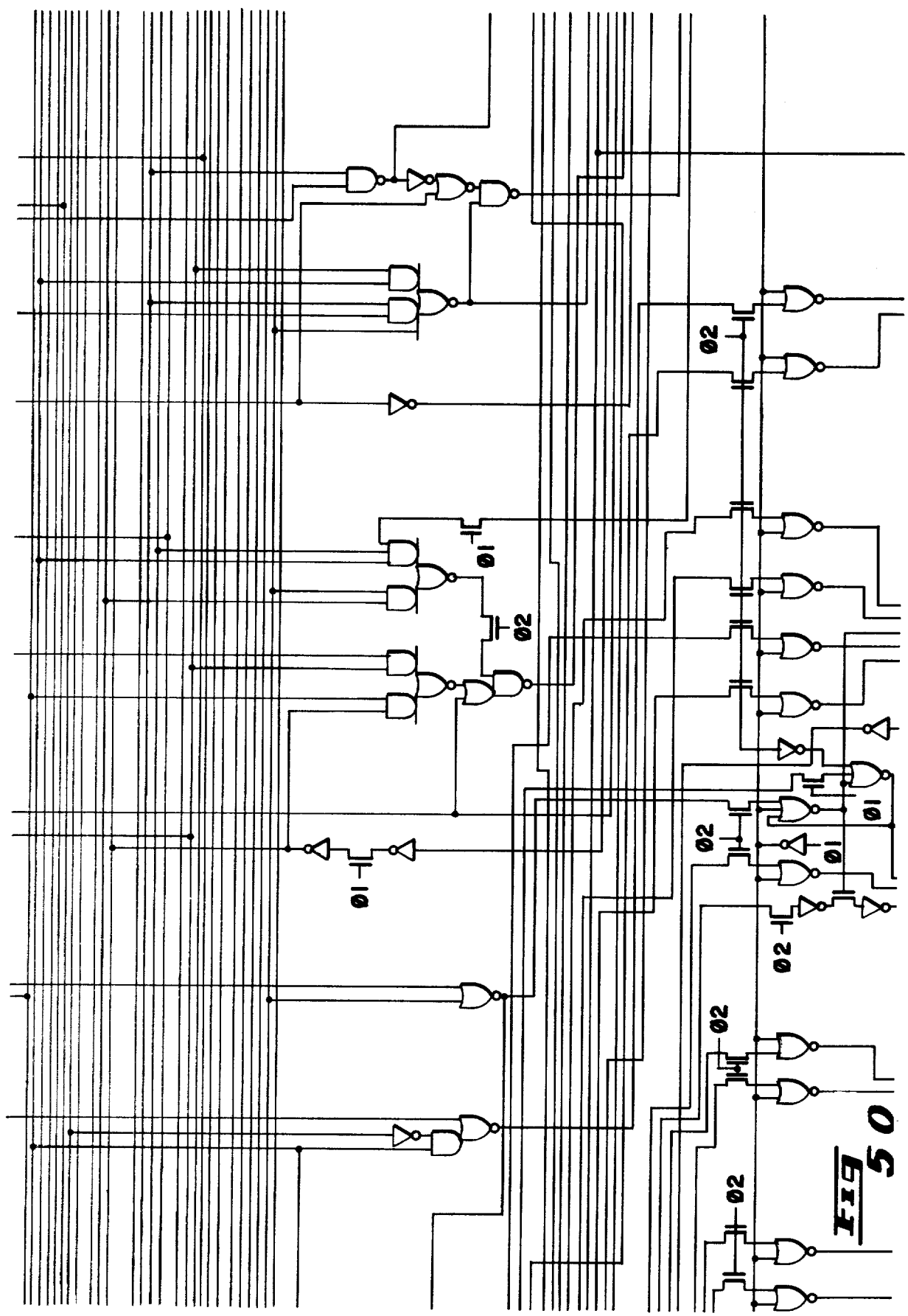

From box 230 of FIG. 2A, the subsequent operation of the microprocessor as regards the execution of the STA instruction (direct addressing mode) proceeds along line 201 to decision box 224 in FIG. 2C. Since no jump-to- subroutine (JSR) has been specified, the operation proceeds along lines 234, 207, and 214 to time frame $\overline{T1}$ D$\phi\phi$ underneath the STA A entry condition, I7 $\overline{I6}$ $\overline{I3}$ I2 I1 I0. Box 235 contains the following data transfers:

| | |
|---|---|
| PC→AB→INC | (10) |
| AFFECT N, Z | (11) |
| CLEAR V | (12) |
| AND | (13) |

In data transfer (10) the contents, 3, of PCL 15 are transferred to ABL 2 and from there to INCL 13. In data transfer (11) the N and Z bits in the condition code register 30 are changed or not changed depending upon the results of the "AND" operation of the ALU 28 during data transfer (8). During data transfer (12) the V bit in condition code register 30 is cleared, indicating no overflow has occurred. In data transfer (13) the A and B inputs to ALU 28 are again logically "ANDed".

The various conditions indicated by condition code register 30 are indicated by respective bits designated N (negative number), Z (zero), V (overflow), C (carry/borrow), I (interrupt mask), and H (half-carry from bit 3).

From the time frame indicated by box 235 in FIG. 2H the microprocessor operation proceeds to box 236 in which data transfers substantially identical to those initially performed in box 225 of FIG. 2A occur. Namely, the next instruction, occurring at memory location 3, is loaded into the instruction register I/R 50, and the contents of INC are sent to OBL 32 and OBH 31 as well as to PC.

During time frame $\phi$2 occurring between boxes 235 and 236, the contents of INCL is incremented by 1 and the contents of memory location 3, i.e. the next instruction, is fetched from memory and placed into the data buffer DBI 47.

From box 236 in FIG. 2H the microprocessor operation exits via return symbol 237 to the T1 time frame designated by the next instruction, and the microprocessor operation then proceeds in accordance with operations set forth in the instruction flowchart beneath the next instruction.

By providing the additional data bus in the microprocessor of the present invention, the number of machine cycles required during the execution of many instructions of the instruction set has been reduced from the number required for the previous generation MC6800 microprocessor. For example, with regard to the STA instruction in the direct and extended addressing modes, one machine cycle has been saved, and two machine cycles have been saved in the indexed addressing mode. With regard to the STS (Store Stack Register) instruction one machine cycle has been saved in each of the direct and extended addressing modes, and two machine cycles have been saved in the indexed addressing mode. Regarding the STX (Store Index Register) instruction one machine cycle has been saved in each of the direct and extended addressing modes, and two machine cycles have been saved in the indexed addressing mode. In the TSX (Transfer Stack Pointer to Index Register) and TXS (Transfer Index Register to Stack Pointer) instructions one machine cycle has been saved in the inherent addressing mode. In the DEX (Decrement Index Register) and INX (Increment Index Register) instructions one machine cycle has been saved in the inherent addressing mode. In the DES (Decrement Stack Pointer) and INS (Increment Stack Pointer) instructions one machine cycle has been saved in the inherent addressing mode. In the BSR (Branch to Subroutine) instruction two machine cycles have been saved in the relative addressing mode by utilizing the additional data bus in conjunction with the Carry Anticipator Circuit described in Ser. No. 939,742 of Wiles et al, filed on even date herewith. In the JSR (Jump-to-Subroutine) instruction two machine cycles have been saved in the indexed addressing mode, and three machine cycles have been saved in the extended addressing mode, by utilizing the additional data bus of the present invention in conjunction with the above-described Carry Anticipator Circuit. In the LDS (Load Stack Pointer) and LDX (Load Index Register) instructions one machine cycle has been saved in the indexed addressing mode.

In the SUB (Subtract), CMP (Compare), SBC (Subtract with Carry), AND (Logical AND), BIT (Bit Test), LDA (Load Accumulator), EOR (Exclusive OR), ADC (Add with Carry), ORA (Inclusive OR Accumulator), ADD (Add), NEG (Negate), COM (Complement), LSR (Logical Shift Right), ROR (Rotate Right), ASR (Arithmetic Shift Right), ASL (Arithmetic Shift Left), ROL (Rotate Left), DEC (Decrement), INC (Increment), TST (Test), and CLR (Clear) one machine cycle is saved in the indexed addressing mode as a result of providing the additional internal data bus NDB 8.

Figure 5C:
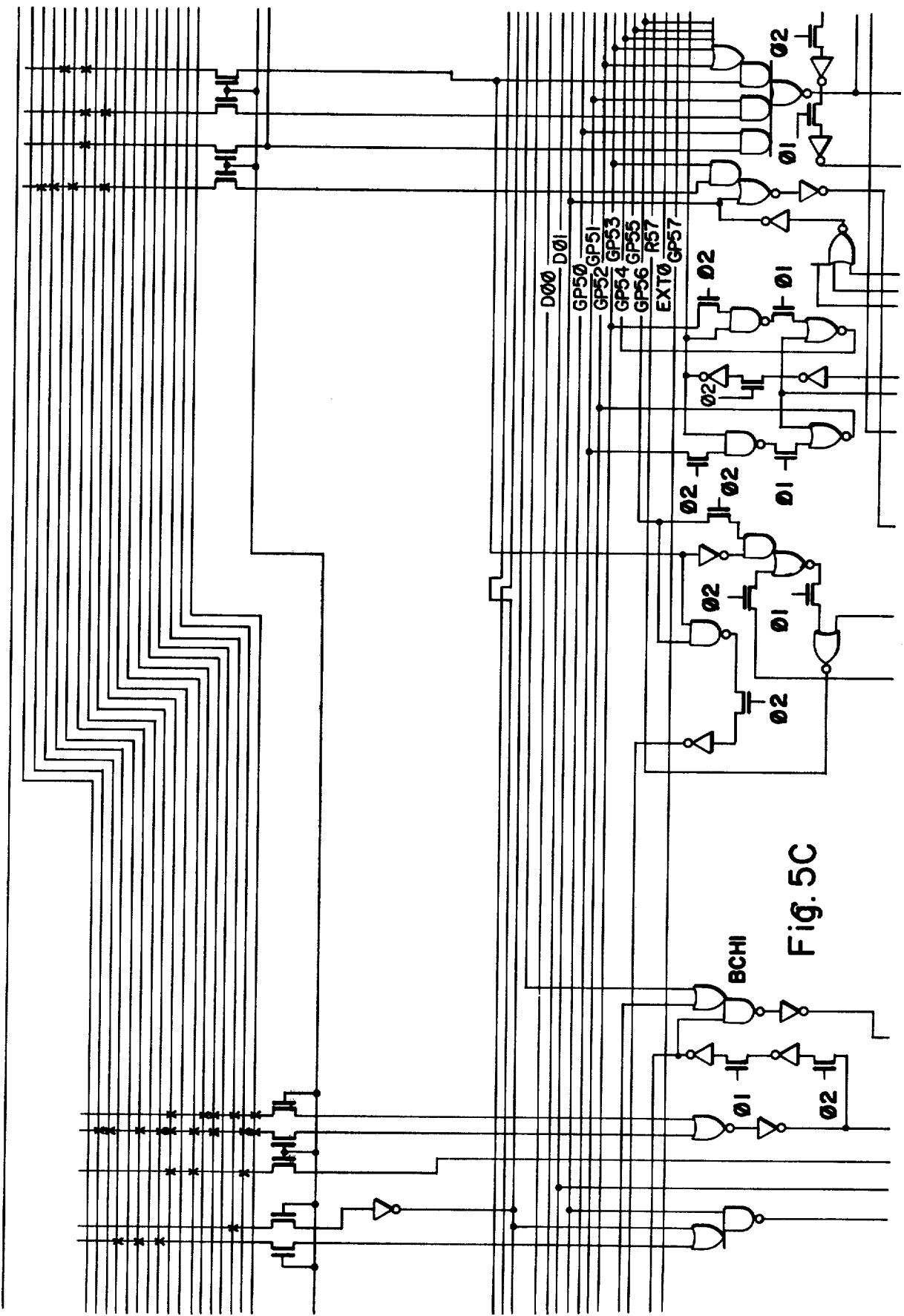
FIGS. 5A-5AA constitute a detailed logic diagram for the microprocessor of FIG. 1.
Figure 5D:
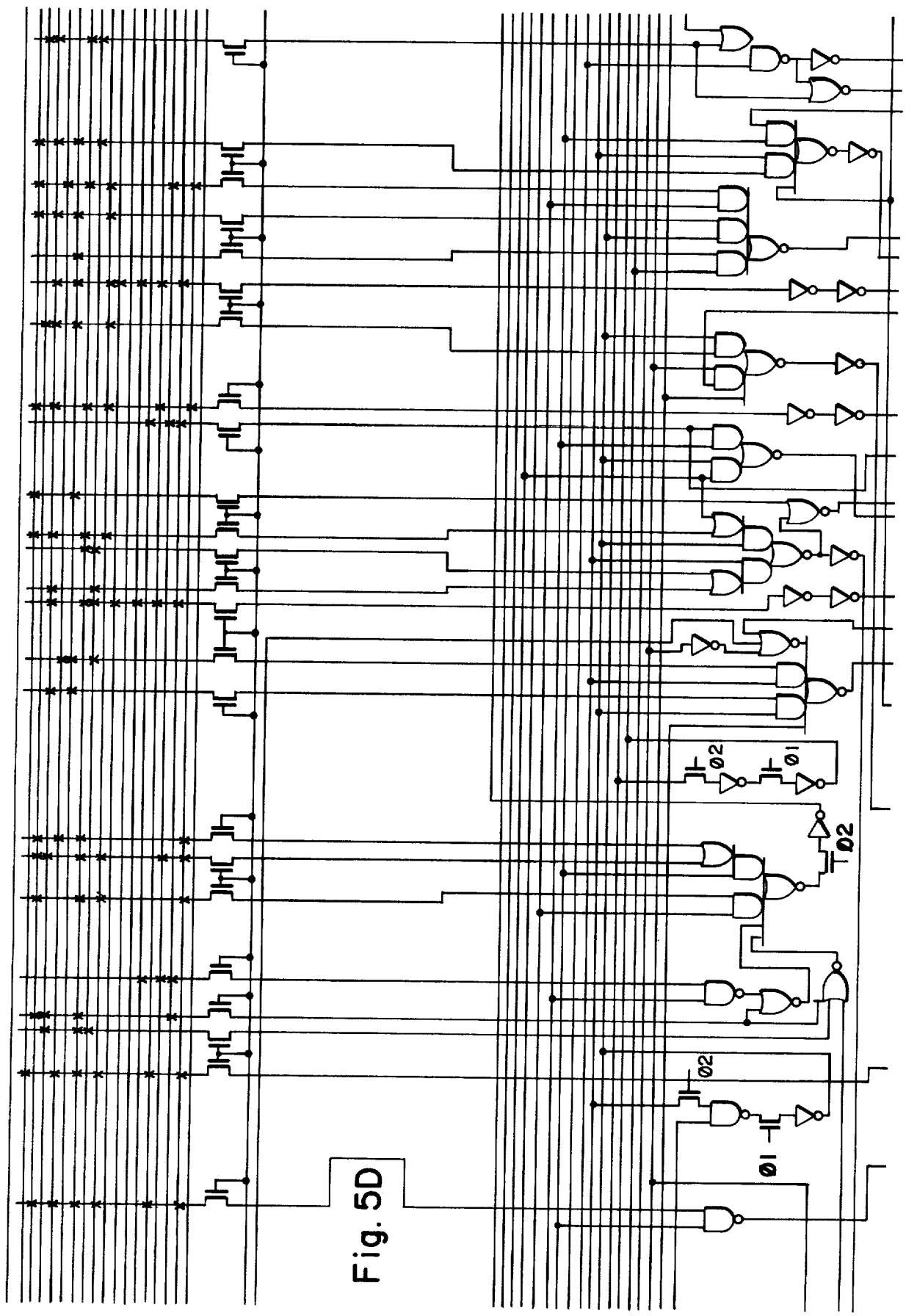
Figure 5E:
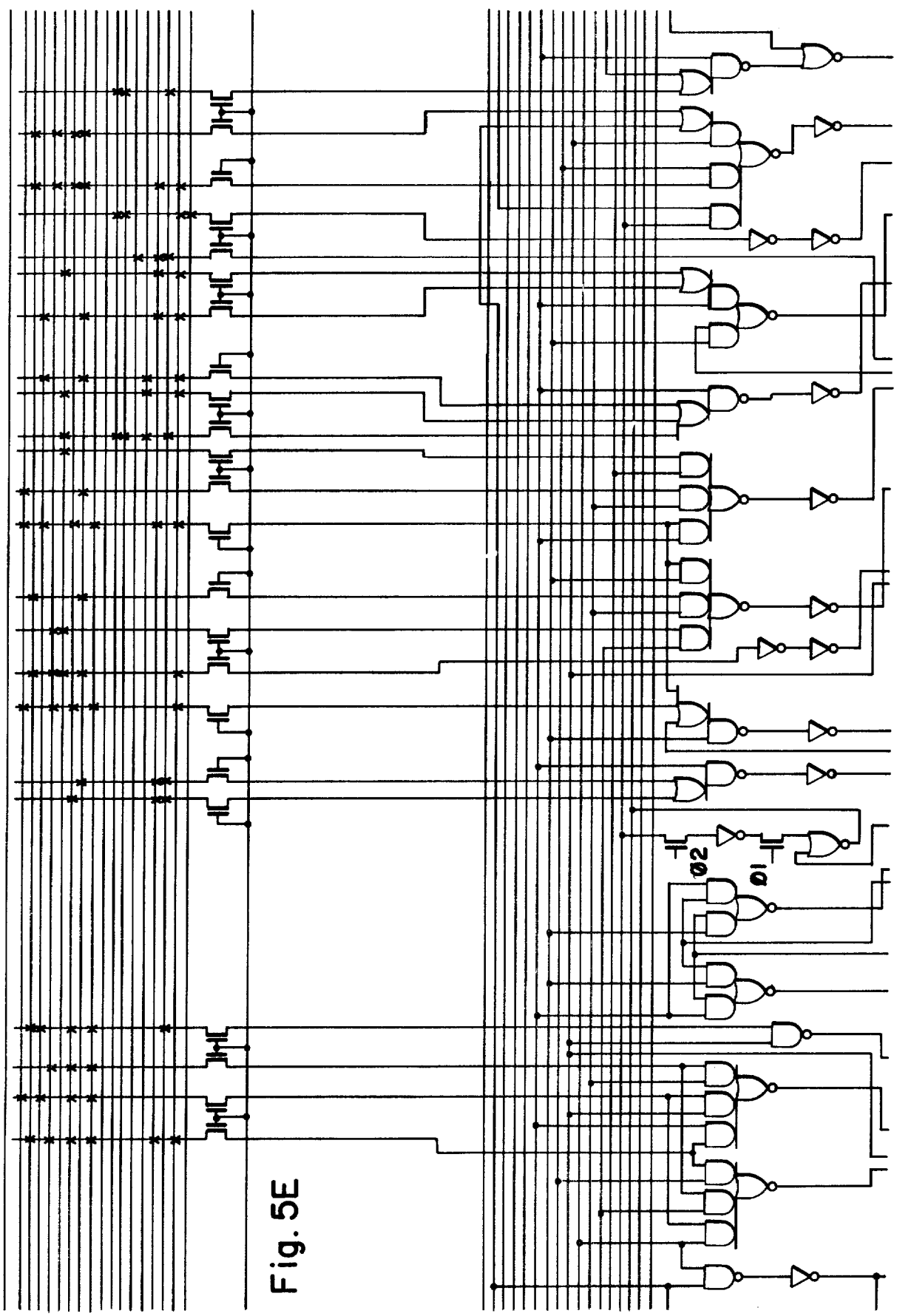
Figure 5F:
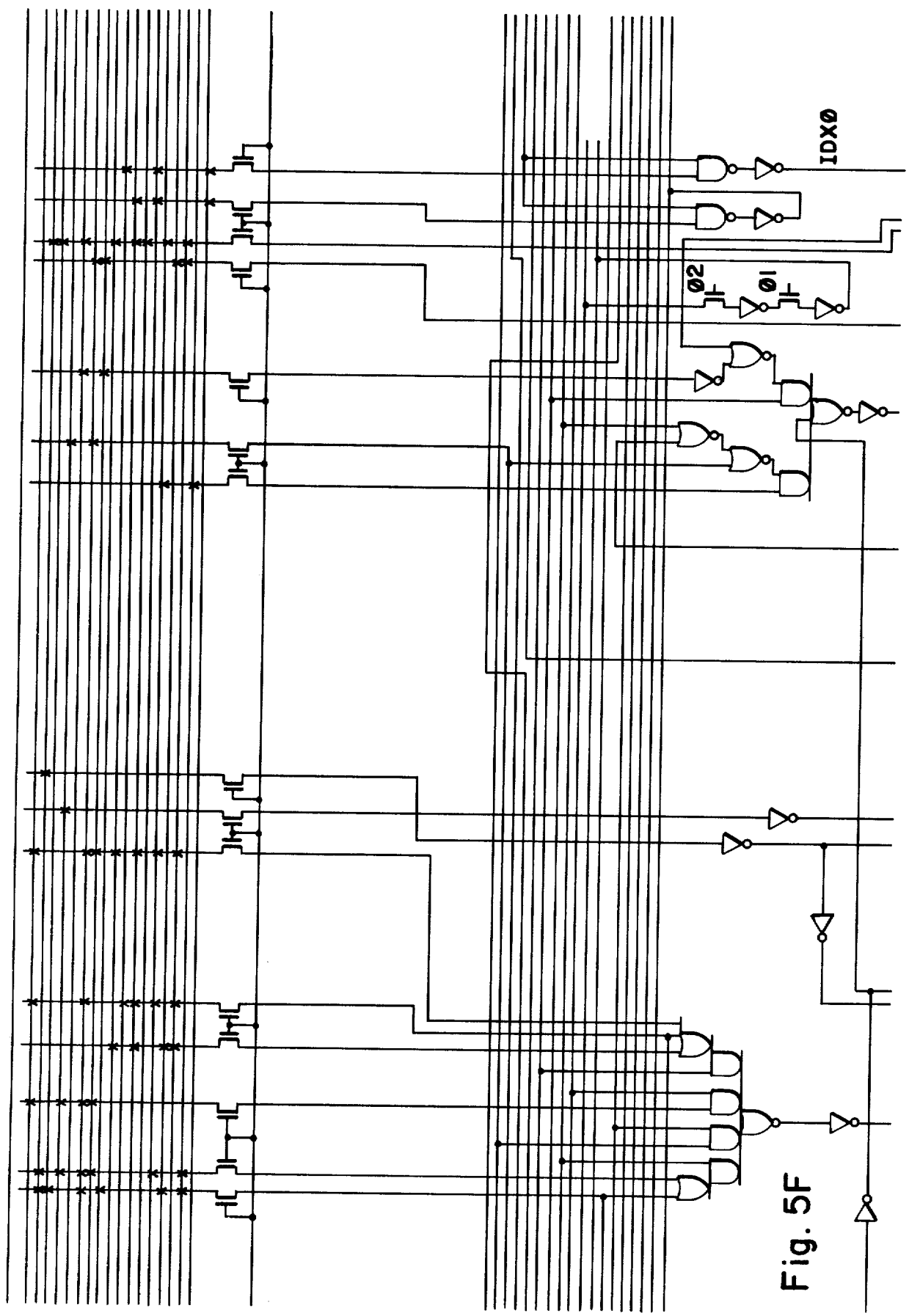
Figure 5G:
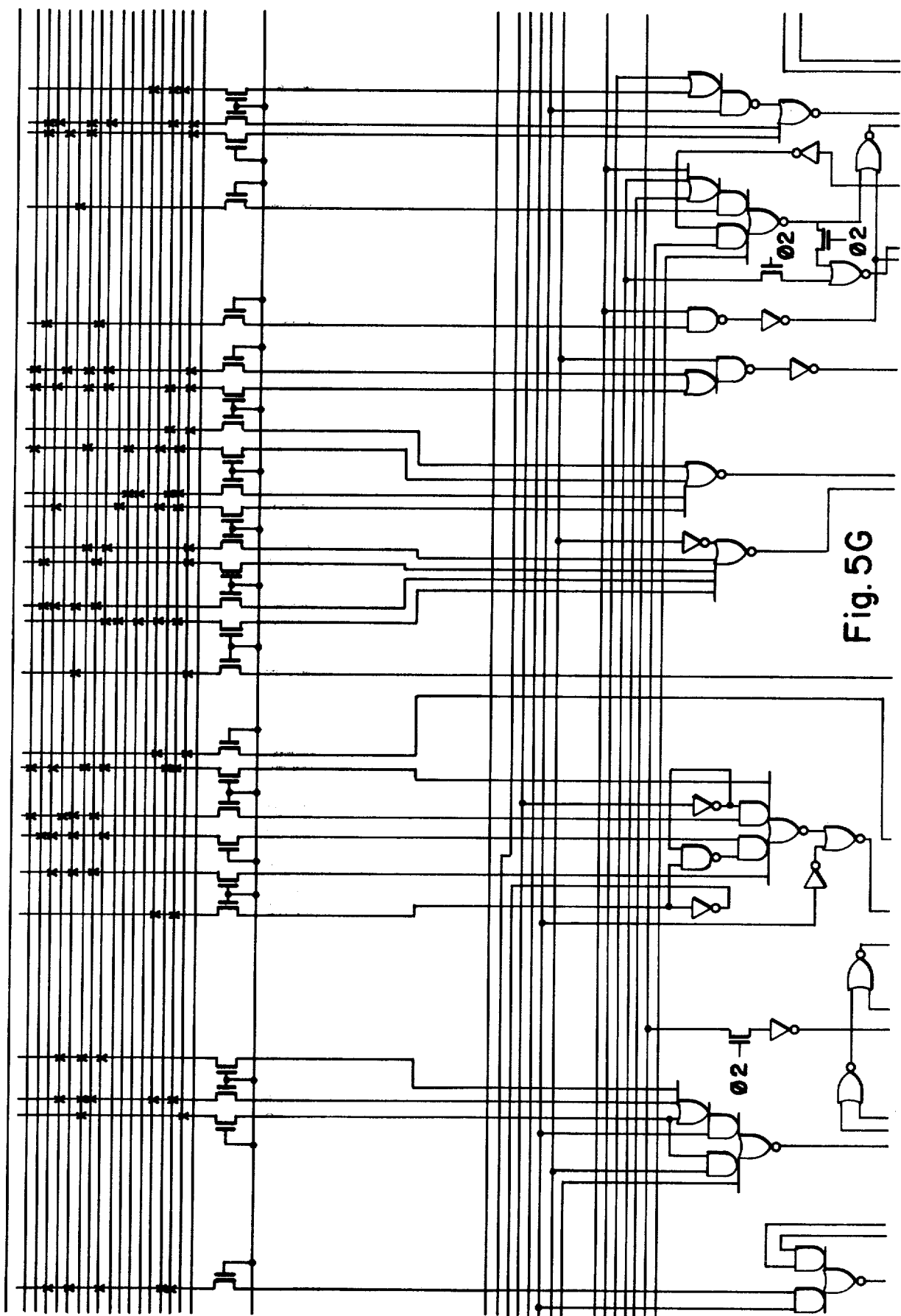
Figure 5H:
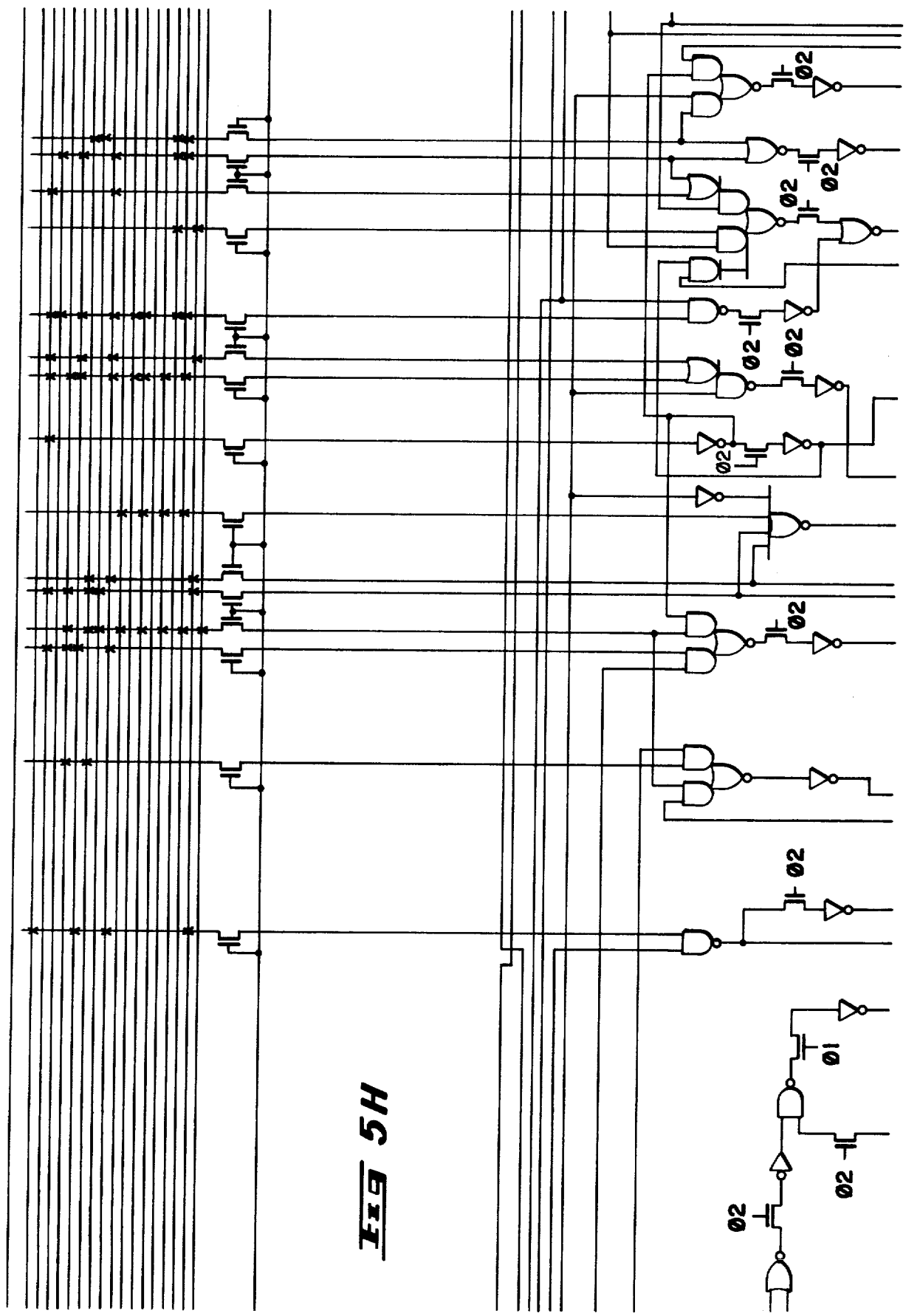
Figure 5M:
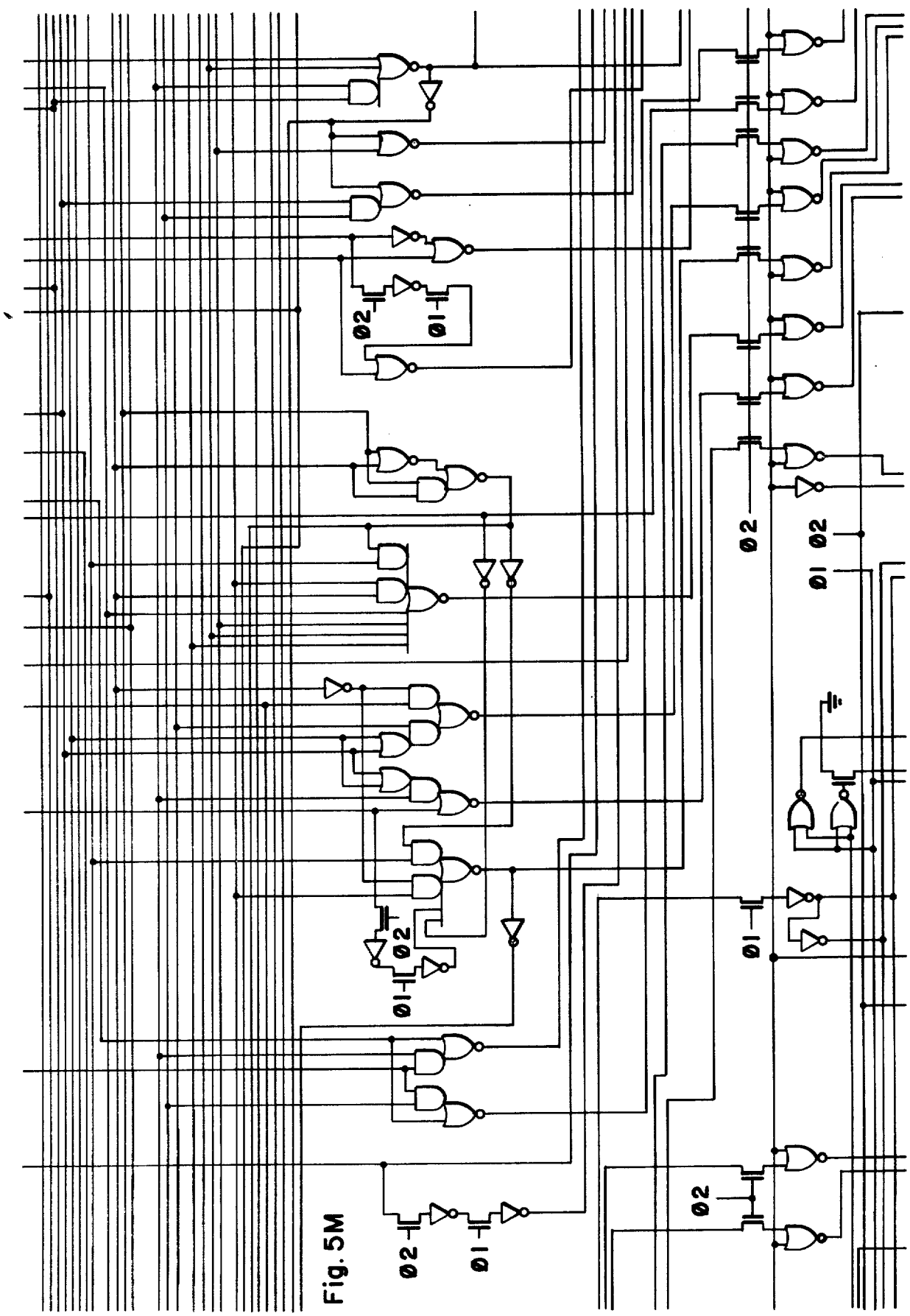
Figure 5P:
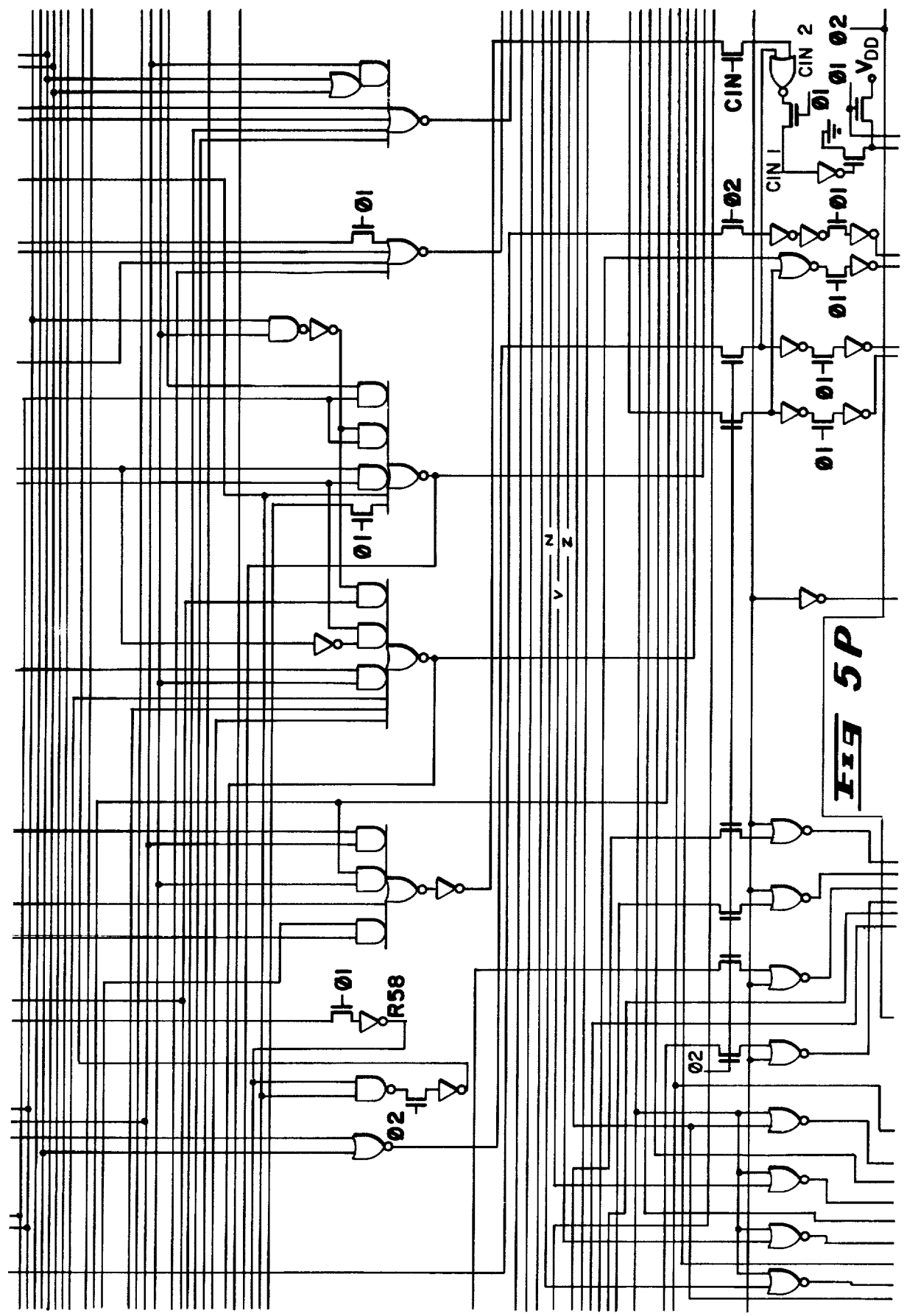
Figure 5S:
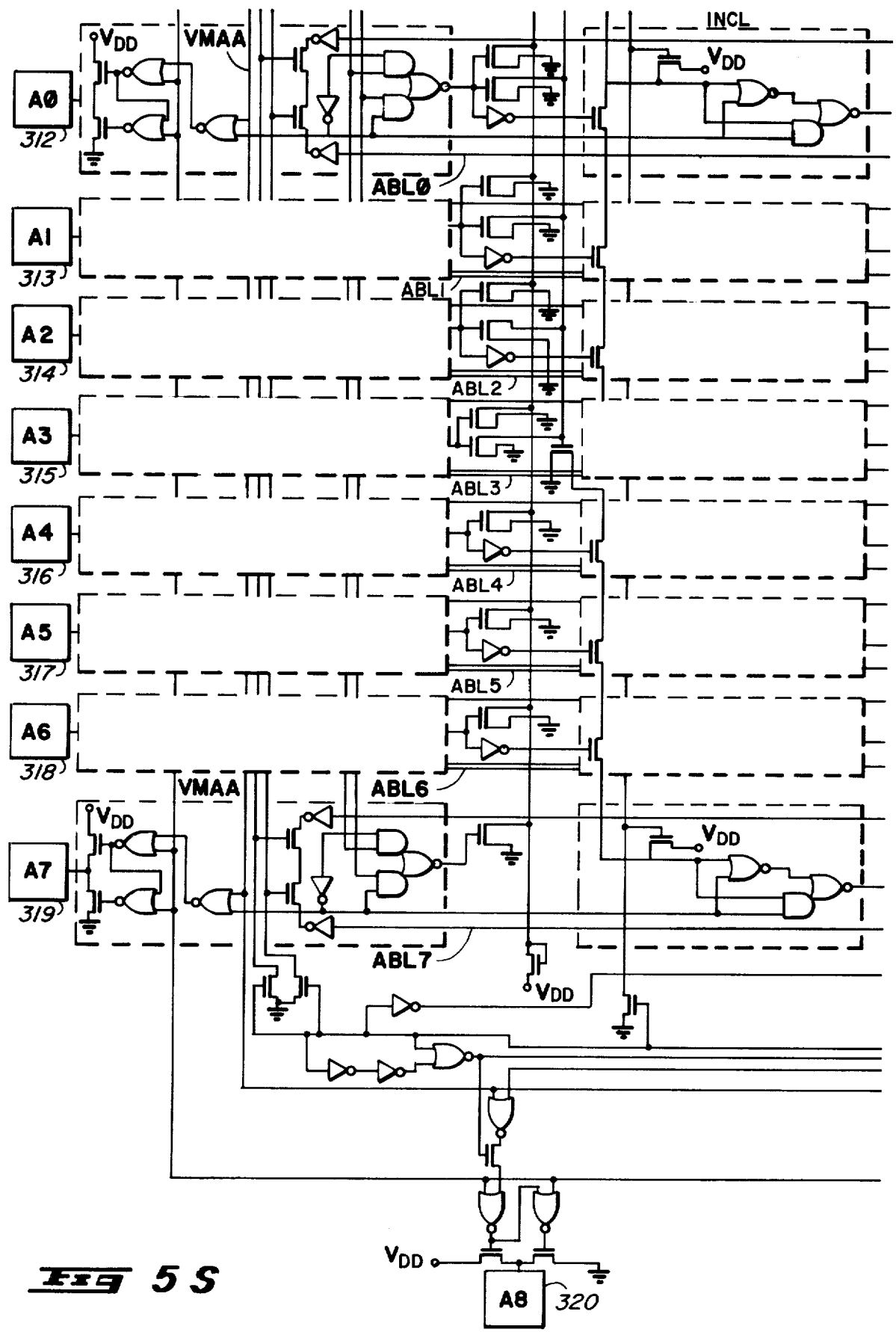
Figure 5U:
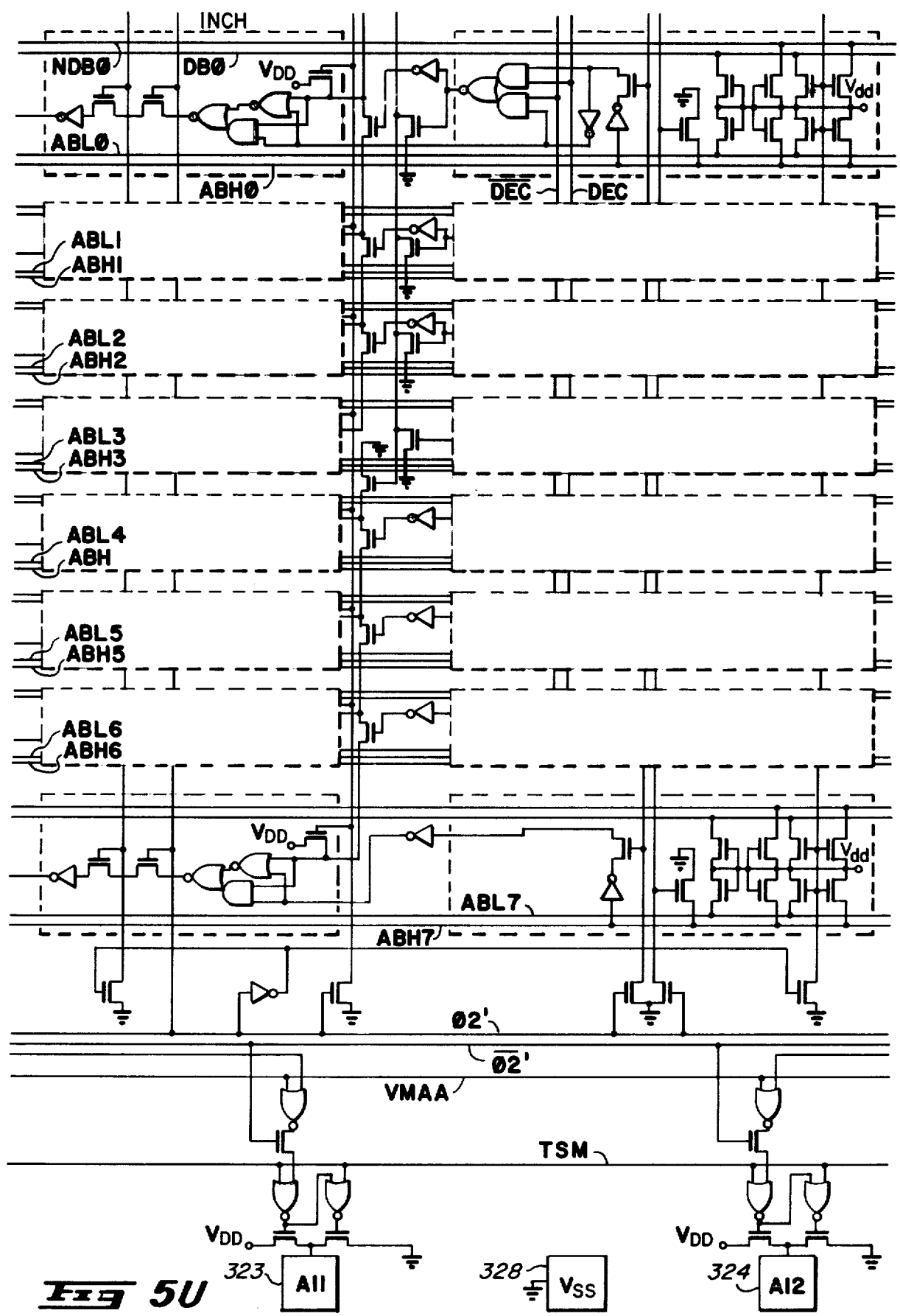
Figure 5W:
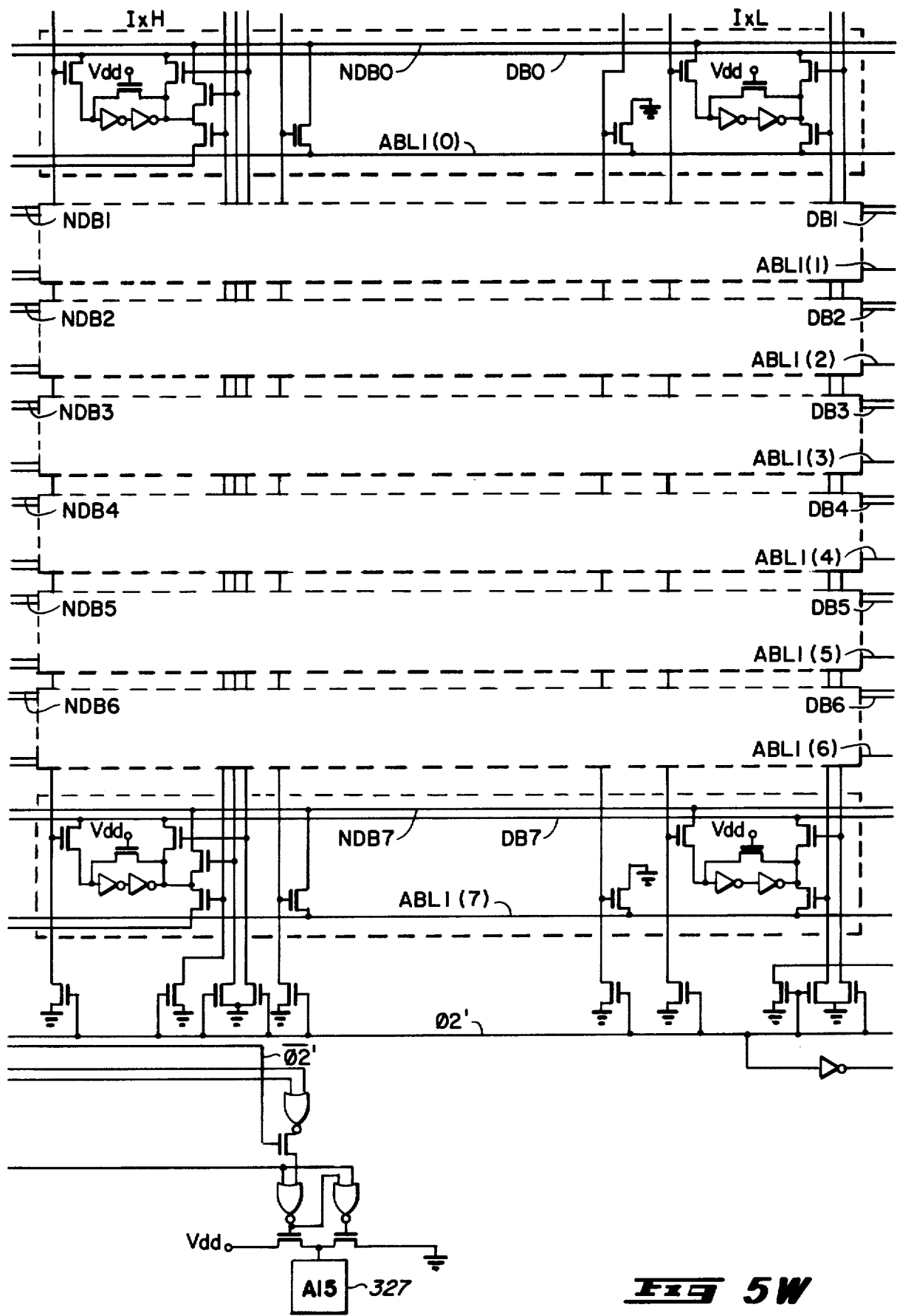
Figure 5X:
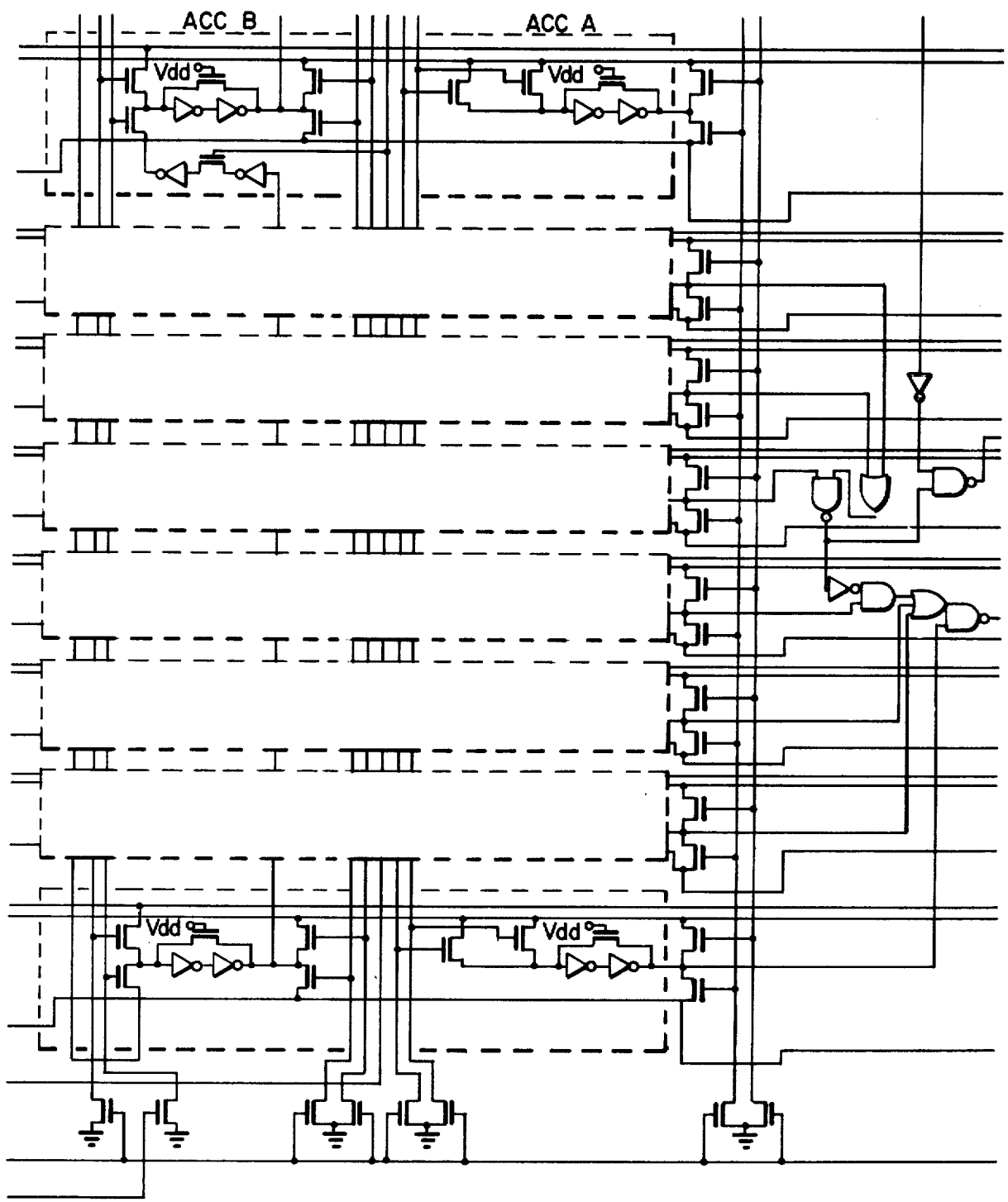
Figure 5Y:
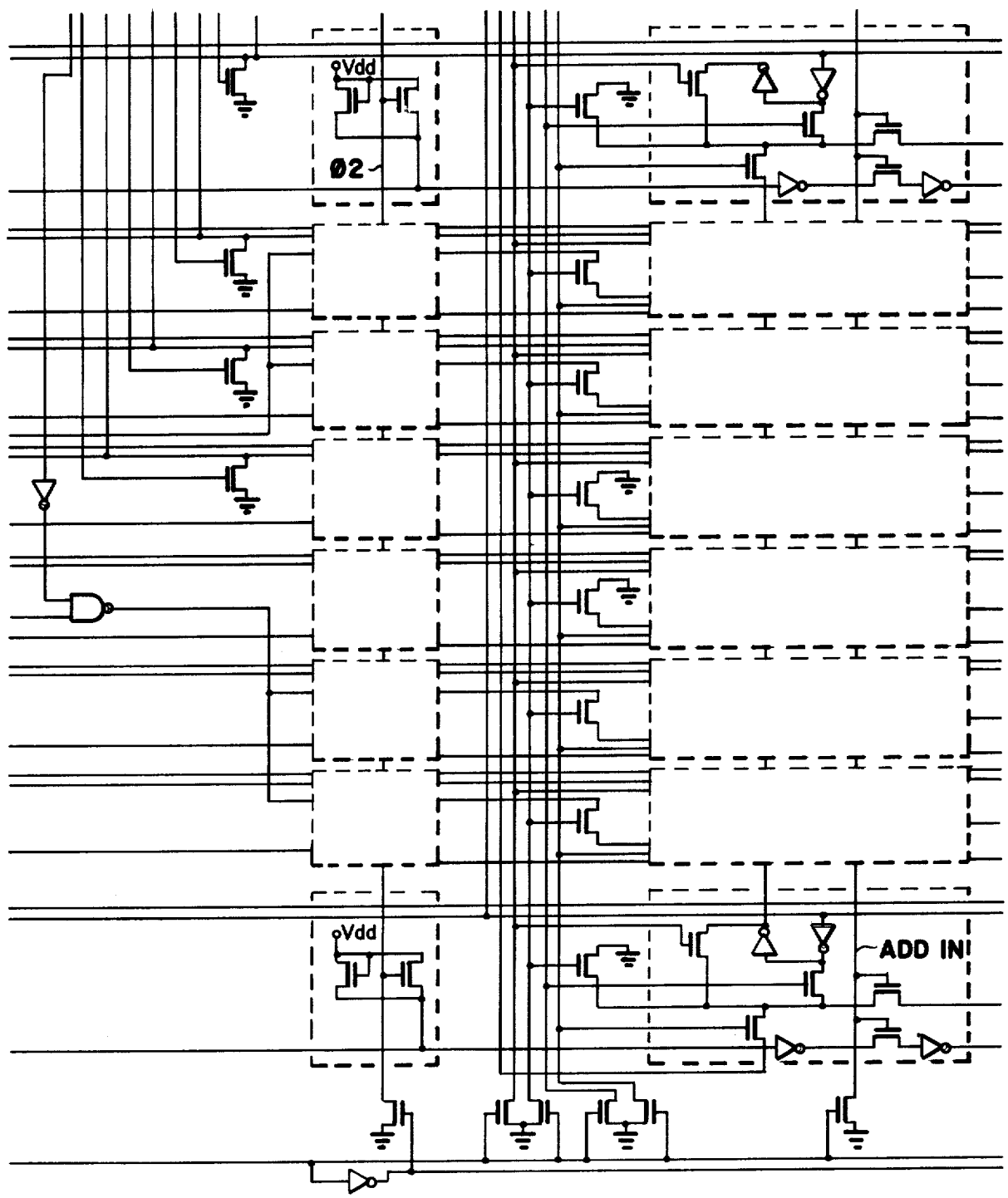
Figure 5Z:
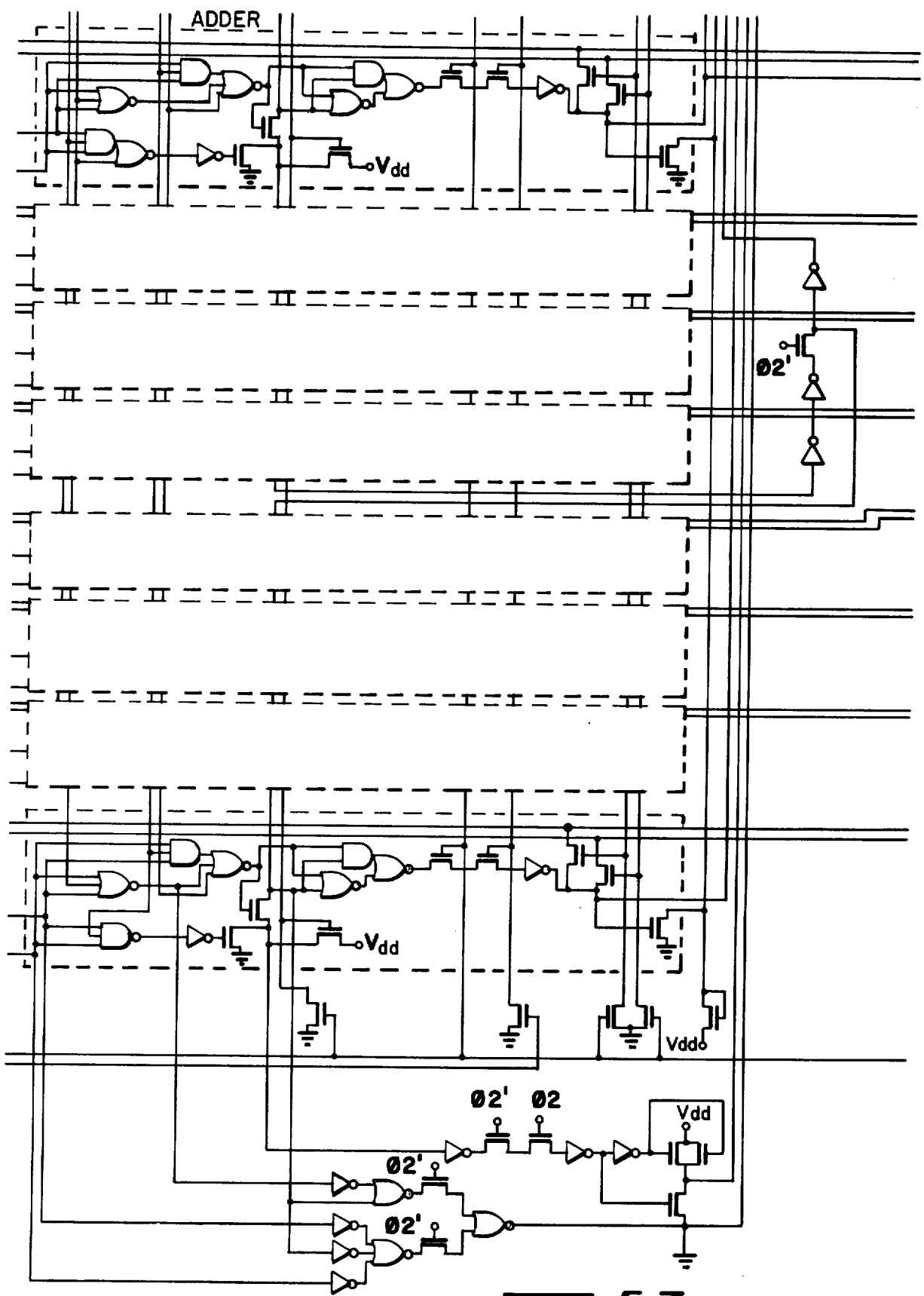
Figure 5A:
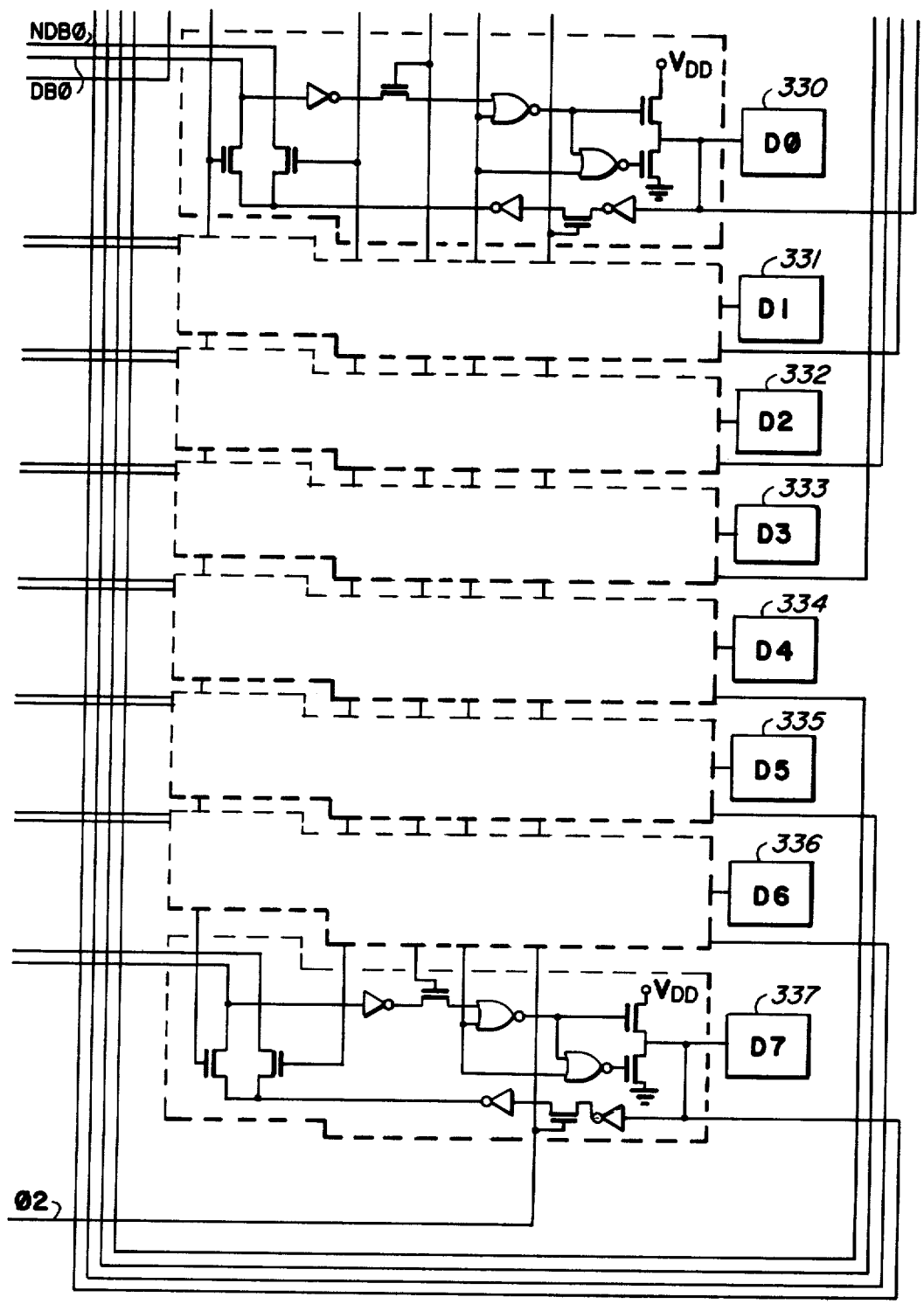
Figure 6:
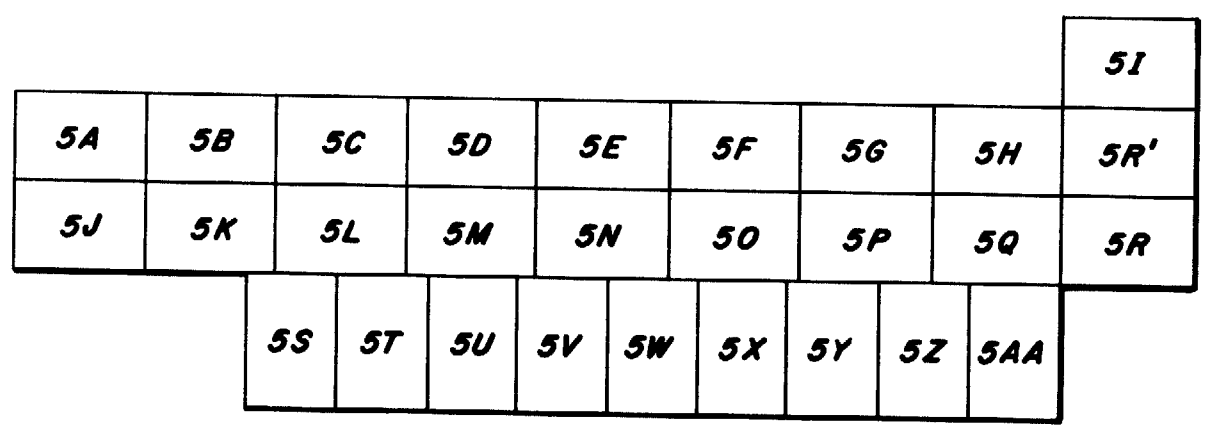

FIGS. 5A–5AA constitute individual sections of a preferred embodiment of the miroprocessor of the present invention. The individual figures may be fitted together in the manner shown by FIG. 6 to form the complete logic schematic of the microprocessor. Given the logic schematic of FIGS. 5A–5AA, one of ordinary skill in the art is enabled to implement the microprocessor of the present invention by using existing circuit technology, such as MOSFET (metal oxide semiconductor field effect transistor) technology. A detailed recitation of the interconnections between the logic and circuit elements shown in FIGS. 5A–5AA would only encumber the description. However, various of the structures shown in FIG. 1 will be highlighted in the detailed logic schematic of FIGS. 5A–5AA.

FIG. 5A shows the clock pad 301 which receives the clock signal E. Appropriate circuitry generates internal clock signal $\phi$1 over line 400 and clock signal $\phi$2 over line 401, and it will be understood that lines (not shown)

distribute the φ1 and φ2 clocks throughout the microprocessor to the various transfer gates where they are required. The $\overline{\text{Halt}}$ input pad 302 is responsive to the Halt signal for determining the Halt/Go condition of the microprocessor. $\overline{\text{LIR}}$ pad 300 is a test pad which generates an LIR output signal in synchronism with the latching of an instruction into the instruction register I/R 50, which output signal may be used by a logic analyzer to monitor the operation of the microprocessor.

FIGS. 5B–5I show the instruction decoding circuit along the top portion thereof. Some of the circuitry for transmitting and generating the various internal timing signals is shown along the lower portions of FIGS. 5B–5I. It should be noted that in FIGS. 5A–5AA the various timing control signals are indicated which appear in the small boxes in the lower right-hand corner of each φ1 time slot in the instruction flowchart of FIG. 2.

FIG. 5I the instruction register I/R is shown generally by reference number 50. Also shown in FIG. 5I is the R/W pad 303.

FIG. 5J shows the $\overline{\text{IRQ 1}}$ pad 304, $\overline{\text{IRQ 2}}$ pad 305, the $\overline{\text{NMI}}$ pad 306, the BUAV output pad 307, the $V_{DD}$ power supply pad 308, and the $\overline{\text{RESET}}$ input pad 309, in addition to various other microprocessor logic.

FIG. 5K shows a mini-pad 310 which is used only for testing purposes and is not connected to an external pin.

FIGS. 5L–5Q show further portions of the internal control logic circuitry of the microprocessor and will not be described in any detail since the function of such will be apparent to one of ordinary skill.

FIG. 5R shows the data bus enable (DBE) input pad 311, as well as further control logic.

FIG. 5S shows the eight low-order output address pads Aφ–A7, in the form of pads 312–319, respectively. Shown at the bottom of FIG. 5S is the A8 output address pad of the high-order output address lines. Along the right-hand portion of FIG. 5S is shown the INCL register, only the lowest-order cell of which is fully portrayed, since the other cells are identical to the lowest-order cell.

FIG. 5T shows the A9 and A10 output address pads at the bottom thereof. Also shown in FIG. 5T, along the left-hand side thereof, is the low-order portion PCL of the program counter. Along the right-hand side of FIG. 5T is shown the high-order portion PCH of the program counter.

FIG. 5U shows the A11 and A12 high-order output address lines in the form of pads 323 and 324, respectively. Also at the bottom of FIG. 5U is the $V_{SS}$ ground pad 328, which is understood to be distributed throughout the logic of FIGS. 5A–5AA. FIG. 5U also shows the high-order portion INCH of the incrementor. Also shown in FIG. 5U are the individual conductors ABLφ–ABL7 of the ABL bus 2 (FIG. 1) and the individual conductors ABHφ–ABH7 of the ABH bus 10 (FIG. 1).

FIG. 5V shows the A13 and A14 output address lines in the form of pads 325 and 326, respectively. FIG. 5V also shows the high-order and low-order portions, TEMPH and TEMPL, respectively, of the temporary register. In addition, FIG. 5V shows the low-order and high-order portions, SPL and SPH, respectively, of the stack pointer.

FIG. 5W shows the A15 output address line in the form of pad 327 at the bottom thereof. FIG. 5W also shows the high-order portion IXH of the index register along the left-hand side thereof and the low-order portion IXL of the index register along the right-hand side thereof. Also indicated in FIG. 5W are the individual conductors NDBφ–NDB7 of the NDB bus 8 (FIG. 1). Also shown in FIG. 5W are the individual conductors of the ABL1 bus 4 (FIG. 1). and of DB bus 6 (FIG. 1).

FIG. 5X shows the B accumulator in the left-hand portion and the A accumulator to the right of the B accumulator.

FIGS. 5Y and 5Z show the ALU logic circuitry.

FIG. 5AA shows the eight Dφ–D7 lines in the form of pads 330–337, respectively along the right-hand portion thereof, as well as the data buffer circuitry in the center portion thereof.

It will be apparent to those skilled in the art that the disclosed Microprocessor With Plural Internal Data Buses may be modified in numerous ways and may assume many embodiments other than that specifically set out and described above. Accordingly, it is intended by the appended claims to cover all modifications of the invention which fall within the true spirit and scope of the invention.

TABLE 1

| MICROPROCESSOR INSTRUCTION SET | |
|---|---|
| ABA | Add Accumulators |
| ABX | Add Accumulator B to Index Register |
| ADC | Add with Carry |
| ADD | Add |
| ADDD | Double Add Without Carry |
| AND | Logical And |
| ASL | Arithmetic Shift Left |
| ASLD | Logical Double Shift Left A:B |
| ASR | Arithmetic Shift Right |
| BCC | Branch if Carry Clear |
| BCS | Branch if Carry Set |
| BEQ | Branch if Equal to Zero |
| BGE | Branch if Greater or Equal Zero |
| BGT | Branch if Greater than Zero |
| BHI | Branch if High |
| BIT | Bit Test |
| BLE | Branch if Less or Equal |
| BLS | Branch if Lower or Same |
| BLT | Branch if Less than Zero |
| BMI | Branch if Minus |
| BNE | Branch if Not Equal to Zero |
| BPL | Branch if Plus |
| BRA | Branch Always |
| BSR | Branch to Subroutine |
| BVC | Branch if Overflow Clear |
| BVS | Branch if Overflow Set |
| CBA | Compare Accumulators |
| CLC | Clear Carry |
| CLI | Clear Interrupt Mask |
| CLR | Clear |
| CLV | Clear Overflow |
| CMP | Compare |
| COM | Complement |
| CPX | Compare Index Register |
| DAA | Decimal Adjust |
| DEC | Decrement |
| DES | Decrement Stack Pointer |
| DEX | Decrement Index Register |
| EOR | Exclusive OR |
| Inc | Increment |
| INS | Increment Stack Pointer |
| INX | Increment Index Register |
| JMP | Jump |
| JSR | Jump to Subroutine |
| LDA | Load Accumulator |
| LDAD | Double Load Accumulator A:B |
| LDS | Load Stack Pointer |
| LDX | Load Index Register |
| LSR | Logical Shift Right |
| LSRD | Logical Double Shift Right A:B |
| MUL | Multiply Unsigned |
| NEG | Negate |
| NOP | No Operation |
| ORA | Inclusive OR Accumulator |
| PSH | Push Data |
| PSHX | Push Index Register Onto Stack |

TABLE 1-continued
MICROPROCESSOR INSTRUCTION SET

| | |
|---|---|
| PUL | Pull Data |
| PULX | Pull Index Register From Stack |
| ROL | Rotate Left |
| ROR | Rotate Right |
| RTI | Return from Interrupt |
| RTS | Return from Subroutine |
| SBA | Subtract Accumulators |
| SBC | Subtract with Carry |
| SEC | Set Carry |
| SEI | Set Interrupt Mask |
| SEV | Set Overflow |
| STA | Store Accumulator |
| STAD | Double Store Accumulator A:B |
| STS | Store Stack Register |
| STX | Store Index Register |
| SUB | Subtract |
| SUBD | Double Subtract Without Carry |
| SWI | Software Interrupt |
| TAB | Transfer Accumulators |
| TAP | Transfer Accumulators to Condition Code Reg. |
| TBA | Transfer Accumulators |
| TPA | Transfer Condition Code Reg. To Accumulator |
| TST | Test |
| TSX | Transfer Stack Pointer to Index Register |
| TXS | Transfer Index Register to Stack Pointer |
| WAI | Wait for Interrupt |

TABLE 2
INSTRUCTION EXECUTION TIMES IN MACHINE CYCLES

| ACCX | Immediate | Direct | Extended | Indexed | Inherent | Relative | ACCX | Immediate | Direct | Extended | Indexed | Inherent | Relative |
|---|---|---|---|---|---|---|---|---|---|---|---|---|---|
| ABA • | • | • | • | • | 2 | • | INX • | • | • | • | • | 3 | • |
| ABX • | • | • | • | • | 3 | • | JMP • | • | • | 3 | 3 | • | • |
| ADC • | 2 | 3 | 4 | 4 | • | • | JSR • | • | • | 5 | 6 | 6 | • |
| ADD • | 2 | 3 | 4 | 4 | • | • | LDA • | 2 | 3 | 4 | 4 | • | • |
| ADDD • | 4 | 5 | 6 | 6 | • | • | LDAD • | 3 | 4 | 5 | 5 | • | • |
| AND • | 2 | 3 | 4 | 4 | • | • | LDS • | 3 | 4 | 5 | 5 | • | • |
| ASL 2 | • | • | 6 | 6 | • | • | LDX • | 3 | 4 | 5 | 5 | • | • |
| ASLD • | • | • | • | • | 3 | • | LSR 2 | • | • | 6 | 6 | • | • |
| ASR 2 | • | • | 6 | 6 | • | • | LSRD • | • | • | • | • | 3 | • |
| BCC • | • | • | • | • | • | 3 | MUL • | • | • | • | • | 10 | • |
| BCS • | • | • | • | • | • | 3 | NEG 2 | • | • | 6 | 6 | • | • |
| BEQ • | • | • | • | • | • | 3 | NOP • | • | • | • | • | 2 | • |
| BGE • | • | • | • | • | • | 3 | ORA • | 2 | 3 | 4 | 4 | • | • |
| BGT • | • | • | • | • | • | 3 | PSH 3 | • | • | • | • | • | • |
| BHI • | • | • | • | • | • | 3 | PSHX • | • | • | • | • | 4 | • |
| BIT • | 2 | 3 | 4 | 4 | • | • | PUL 4 | • | • | • | • | • | • |
| BLE • | • | • | • | • | • | 3 | PULX • | • | • | • | • | 5 | • |
| BLS • | • | • | • | • | • | 3 | ROL 2 | • | • | 6 | 6 | • | • |
| BLT • | • | • | • | • | • | 3 | ROR 2 | • | • | 6 | 6 | • | • |
| BMI • | • | • | • | • | • | 3 | RTI • | • | • | • | • | 10 | • |
| BNE • | • | • | • | • | • | 3 | RTS • | • | • | • | • | 5 | • |
| BPL • | • | • | • | • | • | 3 | SBA • | • | • | • | • | 2 | • |
| BRA • | • | • | • | • | • | 3 | SBC • | 2 | 3 | 4 | 4 | • | • |
| BSR • | • | • | • | • | • | 6 | SEC • | • | • | • | • | 2 | • |
| BVC • | • | • | • | • | • | 3 | SEI • | • | • | • | • | 2 | • |
| BVS • | • | • | • | • | • | 3 | SEV • | • | • | • | • | 2 | • |
| CBA • | • | • | • | • | 2 | • | STA • | • | 3 | 4 | 4 | • | • |
| CLC • | • | • | • | • | 2 | • | STAD • | • | 4 | 5 | 5 | • | • |
| CLI • | • | • | • | • | 2 | • | STS • | • | 4 | 5 | 5 | • | • |
| CLR 2 | • | • | 6 | 6 | • | • | STX • | • | 4 | 5 | 5 | • | • |
| CLV • | • | • | • | • | 2 | • | SUB • | 2 | 3 | 4 | 4 | • | • |
| CMP • | 2 | 3 | 4 | 4 | • | • | SUBD • | 4 | 5 | 6 | 6 | • | • |
| COM 2 | • | • | 6 | 6 | • | • | SWI • | • | • | • | • | 12 | • |
| CPX • | 4 | 5 | 6 | 6 | • | • | TAB • | • | • | • | • | 2 | • |
| DAA • | • | • | • | • | 2 | • | TAP • | • | • | • | • | 2 | • |
| DEC 2 | • | • | 6 | 6 | • | • | TBA • | • | • | • | • | 2 | • |
| DES • | • | • | • | • | 3 | • | TPA • | • | • | • | • | 2 | • |
| DEX • | • | • | • | • | 3 | • | TST 2 | • | • | 6 | 6 | • | • |
| EOR • | 2 | 3 | 4 | 4 | • | • | TSX • | • | • | • | • | 3 | • |
| INC 2 | • | • | 6 | 6 | • | • | TXS • | • | • | • | • | 3 | • |
| INS • | • | • | • | • | 3 | • | WAI • | • | • | • | • | 9 | • |

What is claimed is:

1. In an integrated circuit microprocessor comprising:
a plurality of registers for storing digital information affecting the operation of said microprocessor,
first data bus means for transferring digital operand information between a first subset of said registers which includes less than all of the registers,
address bus means for transferring digital address information between a second subset of said registers which includes some but not all of the registers in the first subset,
an arithmetic logic unit coupled to said first data bus means and said address bus means for performing computations on said digital information in at least one operation of said microprocessor, and
control means coupled to said registers for controlling the transfer of said digital operand and address information between said registers and said arithmetic logic unit, the improvement comprising:
second data bus means for transferring said digital operand and address information between a third subset of said registers which includes some but not all of the registers in the first and second subsets, and said arithmetic logic unit, under control of said control means, whereby the control means may selectively control the simultaneous transfer of said digital information via the first data, second data and address bus means, in at least one operation of said microprocessor.

2. A microprocessor comprising first and second data buses each having a plurality of conductors;

first and second address buses each having a plurality of conductors;

a first plurality of registers, said registers including a first incrementor, a first program counter, a first temporary register, a first stack pointer, a first index register, and first and second accumulators;

a second plurality of registers including a second incrementor, a second program counter, a secondary temporary register, a second stack pointer, and a second index register;

first means for coupling said first plurality of registers to said first address bus;

second means for coupling said second plurality of registers to said second address bus;

third means for coupling said second incrementor, said first and second programs counters, said second temporary register, said first and second stack pointers, said first and second index registers, and said first and second accumulators to said first data bus; and fourth means for coupling said first incrementor, said first temporary register, said first stack pointer, said first and second index registers, and said first and second accumulators to said second data bus.

3. The processor recited in claim 2 further comprising an arithmetic logic unit for performing computations on digital information to effect operation of said microprocessor; and fifth means for coupling said arithmetic logic unit to said first and second data buses.

* * * * *